United States Patent
Murakami

(10) Patent No.: US 7,758,777 B2
(45) Date of Patent: Jul. 20, 2010

(54) POLARIZING PLATE PROTECTING FILM AND ITS MANUFACTURING METHOD, POLARIZING PLATE AND LIQUID CRYSTAL DISPLAY

(75) Inventor: Takashi Murakami, Hachioji (JP)

(73) Assignee: Konica Minolta Opto, Inc., Tokyo (JP)

(*) Notice: Subject to any disclaimer, the term of this patent is extended or adjusted under 35 U.S.C. 154(b) by 623 days.

(21) Appl. No.: 11/223,753

(22) Filed: Sep. 9, 2005

(65) Prior Publication Data

US 2006/0062935 A1 Mar. 23, 2006

(30) Foreign Application Priority Data

Sep. 17, 2004 (JP) .............................. 2004-271357

(51) Int. Cl.
*B29C 47/06* (2006.01)
*B29C 47/88* (2006.01)

(52) U.S. Cl. .................. 264/1.34; 264/1.17; 264/216; 264/217; 264/173.16; 428/1.31; 428/1.33; 349/96; 349/118

(58) Field of Classification Search ............... 428/1.31, 428/1.3, 1.32, 1.33, 1.54; 264/176.1, 177.11, 264/177.17, 210.1, 210.6, 479; 536/59, 81, 536/71, 73, 76; 203/31–37; 349/96, 117–120
See application file for complete search history.

(56) References Cited

U.S. PATENT DOCUMENTS

| 2,071,333 | A | * | 2/1937 | Dreyfus et al. ................. 536/81 |
| 3,676,182 | A | * | 7/1972 | Smith .......................... 427/316 |
| 4,839,405 | A | * | 6/1989 | Speelman et al. ............. 524/99 |
| 5,219,510 | A | * | 6/1993 | Machell et al. .......... 264/210.6 |
| 5,288,715 | A | * | 2/1994 | Machell et al. ............. 430/531 |
| 6,211,358 | B1 | * | 4/2001 | Honda et al. .................. 536/64 |
| 2004/0161551 | A1 | * | 8/2004 | Tasaka et al. ................. 428/1.3 |

FOREIGN PATENT DOCUMENTS

JP 2000352620 A * 12/2000
WO WO 2005064369 A1 * 7/2005

OTHER PUBLICATIONS

Machine translation of JP 2000-352620.*
JPO Website Machine English Translation of JP 2002-131536, Yajima et al., May 9, 2002.*

* cited by examiner

Primary Examiner—Sophie Hon
(74) Attorney, Agent, or Firm—Lucas & Mercanti, LLP

(57) ABSTRACT

Disclosed is a process for manufacturing a polarizing plate protecting film comprising the steps of providing a film formation composition containing cellulose resin having a total acyl substitution degree of from 2.5 to 2.9, a plasticizer and a hindered amine or hindered phenol compound, heat-melting the film formation composition to obtain a melt, extruding the melt to be in the form of sheet, and cooling the extruded sheet to form a film, wherein the cellulose resin contains an alkaline earth metal in an amount of from 1 to 50 ppm and a residual sulfuric acid (in terms of sulfur content) in an amount of from 0.1 to 45 ppm, based on the weight of cellulose resin.

4 Claims, 1 Drawing Sheet

POLARIZING PLATE PROTECTING FILM AND ITS MANUFACTURING METHOD, POLARIZING PLATE AND LIQUID CRYSTAL DISPLAY

This application is based on Japanese Patent Application No. 2004-271357 filed on Sep. 17, 2004, in Japanese Patent Office, the entire content of which is hereby incorporated by reference.

FIELD OF THE INVENTION

The present invention relates to a polarizing plate protecting film and its manufacturing method, a polarizing plate, and a liquid crystal display.

BACKGROUND OF THE INVENTION

A polarizing plate protecting film is used for protecting a polarizing film. The polarizing plate protecting film is provided on both sides of the polarizing film to form a polarizing plate. Hitherto, a displaying quality of a liquid crystal display has been improved by an optical compensation film which is a viewing angle compensation film having an optical retardation film. Recently, function of an optical retardation film has been added to a polarizing plate protecting film. As a result, the polarizing plate protecting film becomes polyfunctional, which results in reduction of parts.

With respect to the displaying quality of a liquid crystal display, compensation of viewing angle is improved. A viewing angle property of a liquid crystal cell can be improved by providing a discotic liquid crystal film on both sides of a twist nematic (TN) type liquid crystal cell (see for example, Japanese Patent O.P.I. Publication No. 7-191217).

With respect to improvement of viewing angle due to improvement of a liquid crystal mode, there is proposed a liquid crystal display employing a vertical alignment (VA) type liquid crystal cell in which a liquid crystal is substantially vertically oriented when voltage is not applied, and substantially horizontally oriented when voltage is applied (see for example, Japanese Patent O.P.I. Publication No. 2-176625.). The VA type liquid crystal cell provides wide viewing angle and high speed response as compared to a conventional TN type liquid crystal display, but requires further improvement as compared to CRT.

The VA type liquid crystal display provides black display by a liquid crystal layer approximately vertically oriented and a pair of polarizing plates each provided-in a crossed Nicol state on both sides of the liquid crystal layer. This display provides good black display observed from a direction normal to the display surface, but shows light leak observed from a direction (hereinafter referred to as an oblique viewing angle direction) inclined from the normal direction, resulting in poor black display.

This light leak in the oblique viewing angle direction results from the facts that birefringence occurs when the liquid crystal layer approximately vertically oriented is observed from the oblique viewing angle direction and that when the transmission axis of a pair of polarizing plates each provided in a crossed Nicol state on both sides of the liquid crystal layer is observed from the oblique viewing angle direction, the orthogonal relationship is deviated.

With respect to a method for compensating a viewing angle displaying quality from optical view points, there is disclosed in for example, Japanese Patent O.P.I. Publication No. 2003-262869 a designed value of a compensation film in an MVA type liquid crystal display, which is a multi-domain divided VA type liquid crystal display. However, this patent document does not disclose a liquid crystal display employing a polarizing plate with an optical compensation film prepared from a concrete resin nor a liquid crystal display employing a polarizing plate with a polarizing plate protecting film having an optical compensation property for viewing angle compensation. Recently, demand for a TV liquid crystal display for moving image is increased, and a liquid crystal display with a polarizing plate having improved displaying quality and high productivity is required also in this field.

A polarizing film of a polarizing plate is obtained by adsorbing iodine on the polymer film and stretching the resulting film. For example, a polyvinyl alcohol film is immersed in a solution called H ink containing a dichromatic substance (for example, iodine), and uniaxially stretched to orient the dichromatic substance in one direction.

As a protecting film of a polarizing plate, a cellulose resin or cellulose acetates are used, and of the cellulose acetates, cellulose triacetate is preferably used.

Generally, a polarizing plate protecting film made of cellulose resin is used for protecting physically a polarizing plate. As a manufacturing method of the film, a solution casting method is used which employs a solution containing a halogen-containing solvent. A solvent recovery cost is a big burden to this method. Various solvents other than the halogen-containing solvent have been examined, but solvents providing satisfactory solubility of the cellulose resin have not been found as alternative solvents. Instead of alternative solvents, a dissolution method such as a chilling method has been examined (see Japanese Patent O.P.I. Publication No. 10-95861.), but its industrialization is difficult and further study on it is necessary.

As a method for manufacturing a cellulose resin film as a polarizing plate protecting film, a solution casting method is carried out which casts on a support a solution in which cellulose resin is dissolved in a solvent and evaporates the solvents to dry. In the solution casting method, the solvents contained the cellulose resin web cast on the support need be removed by evaporation to dry. Accordingly, investment of equipment such as a drying device, a device for recovering evaporated solvents or a device for reproducing the recovered solvents is necessary, resulting in an increase in cost of manufacture. Reduction of cost of manufacture is a matter of great importance.

In view of the above, a process, which does not employ solvents to be evaporated for drying in film manufacture, is considered to overcome the above-described problems embraced in the solution casting method.

As the method to overcome the above-described problems, film formation according to a melt casting method is proposed (see Japanese Patent O.P.I. Publication No. 2000-352620.). Hitherto, manufacture of a polarizing plate protecting film according to the melt casting method is difficult and has not been put into practical use. It is necessary to solve problems in that film flatness is lowered due to contaminations at the lip of an extruder or film rupture is likely to occur at the slitting section during or after hot stretching.

SUMMARY OF THE INVENTION

An object of the invention is to provide a polarizing plate protecting film manufactured without employing solvents according to a melt casting method, which reduces contaminations at the lip of an extruder, and minimizes rupture at a slitting section during or after hot stretching, and its manufacturing method. Another object of the invention is to provide a polarizing plate employing the polarizing plate protecting film, and a liquid crystal display with improved displaying quality comprising the polarizing plate.

BRIEF EXPLANATION OF THE DRAWING

In FIG. 1, numerical numbers 1a and 1b represent a protective film, numerical numbers 2a and 2b represent an optical retardation film, numerical numbers 5a and 5b represent a polarizing film, numerical numbers 3a and 3b represent a delayed phase axis direction of protective film 2a and a delayed phase axis direction of protective film 2b, respectively, numerical numbers 4a and 4b represent a transmission axis direction of polarizing film 5a and a transmission axis direction of polarizing film 5b, respectively, numerical numbers 6a and 6b represent a polarizing plate, numerical number 7 represent a liquid crystal cell, and numerical number 9 represent a liquid crystal display.

DETAILED DESCRIPTION OF THE INVENTION

Figure 1:
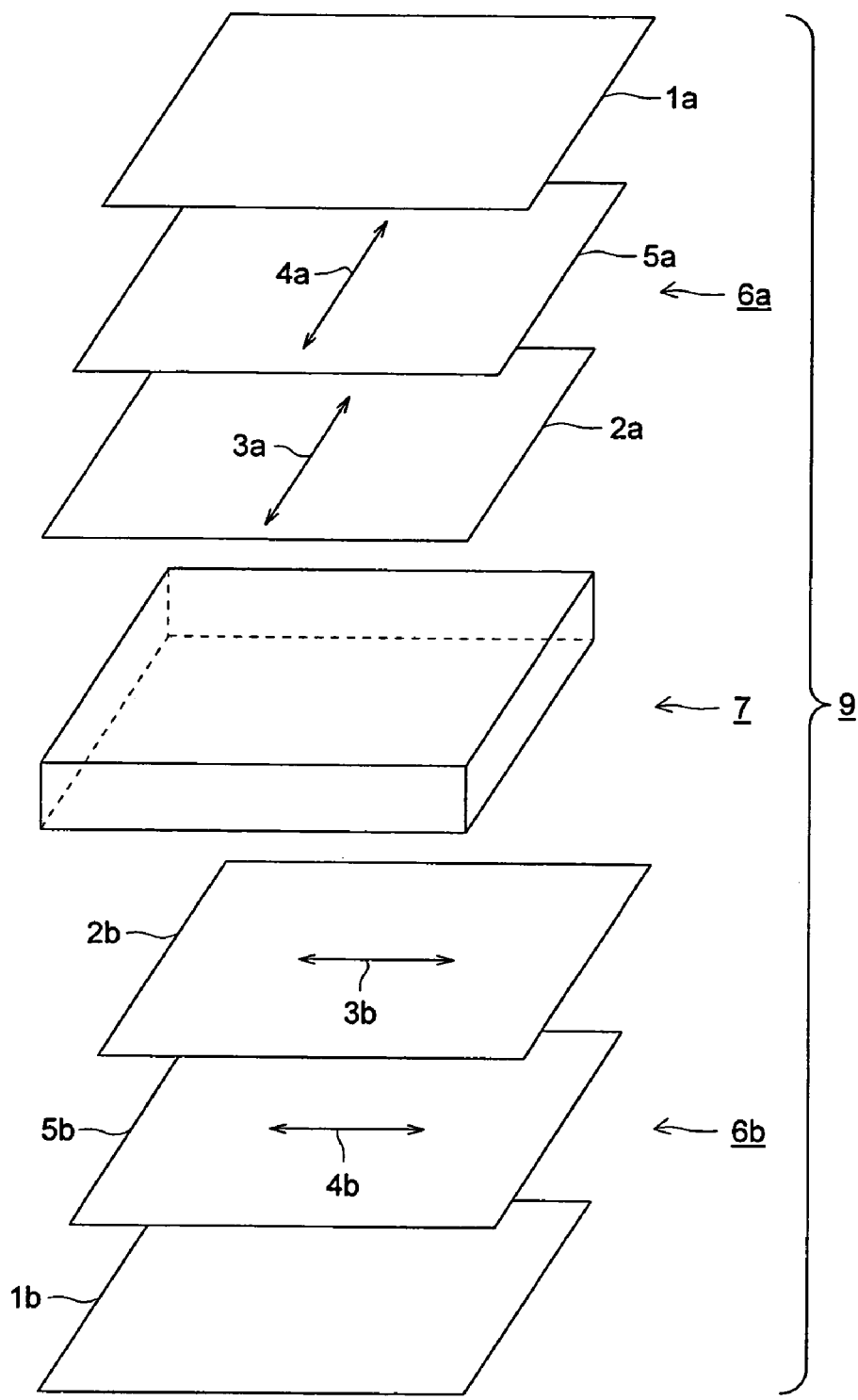
FIG. 1 is a schematic view showing the structure of the liquid crystal display in the invention.

The above objects of the invention can be attained by the followings:

1. A process for manufacturing a polarizing plate protecting film according to a melt casting method, the process comprising the steps of providing a film formation composition containing cellulose resin having a total acyl substitution degree of from 2.5 to 2.9, a plasticizer and 0.01 to 5% by weight of a hindered amine or hindered phenol compound, heat-melting the film formation composition to obtain a melt, extruding the melt to be in the form of sheet, and cooling the extruded sheet to form a film, wherein the cellulose resin contains an alkaline earth metal in an amount of from 1 to 50 ppm and a residual sulfuric acid (in terms of sulfur content) in an amount of from 0.1 to 45 ppm, based on the weight of cellulose resin.

2. The process of item 1 above, wherein the cellulose resin further contains a free acid in an amount of from 1 to 500 ppm, based on the weight of cellulose resin.

3. The process of item 1 above, wherein the cellulose resin further contains a free acid in an amount of from 1 to 100 ppm, based on the weight of cellulose resin.

4. The process of item 1 above, wherein the polarizing plate protecting film has a retardation in plane $R_0$ of from 30 to 200 nm, and a retardation in the thickness direction Rt of from 70 to 400 nm.

5. The process of item 1 above, after the cooling step, further comprising the steps of re-heating the film, stretching the heated film, and cooling the stretched film.

6. A polarizing plate protecting film manufactured by the process of item 1 above.

7. A polarizing plate comprising a polarizing film, and the polarizing plate protecting film of item 1 above provided on at least one surface of the polarizing film.

8. A liquid crystal display comprising the polarizing plate of item 7 above.

Study has been made on a method to obtain a film by heat melting cellulose resin. As a result, it has been found that a polarizing plate protecting film is obtained by heat melting and casting cellulose resin at optimum temperature to form a film, a polarizing plate protecting film with optical characteristics (an optical retardation film) is obtained by stretching, and a liquid crystal display with improved displaying quality is obtained which employs a polarizing plate comprising the polarizing plate protecting film.

The present inventor has made an extensive study and as a result, he has found that a polarizing plate protecting film described below is manufactured without employing solvents according to a melt casting method, which reduces contaminations at the lip of an extruder, and minimizes rupture at a slitting section during or after hot stretching. The process of the invention, manufacturing a polarizing plate protecting film according to a melt casting method, comprises the steps of providing a film formation composition containing cellulose resin having a total acyl substitution degree of from 2.5 to 2.9, a plasticizer and 0.01 to 5% by weight of a hindered amine or hindered phenol compound, heat-melting the film formation composition to obtain a melt, extruding the melt to be in the form of sheet, and cooling the extruded sheet to form a film, wherein the cellulose resin contains an alkaline earth metal in an amount of from 1 to 50 ppm and a residual sulfuric acid (in terms of sulfur content) in an amount of from 0.1 to 45 ppm, based on the weight of cellulose resin. This film manufacturing process provides reduced contaminations at the lip of the extruder and minimizes rupture at a slitting section during or after hot stretching.

The invention will be detailed below, but the invention. is not limited thereto.

[Melt Casting Method]

The polarizing plate protecting film of the invention is characterized in that it is a cellulose resin film formed according to a melt casting method. That is, the film is manufactured employing a melt obtained by heat-melting a film formation composition, without a solvent as used in a solution casting method.

The heat-melting film formation method can be further classified into a melt extrusion method, a pressing method, an inflation method, an injection method, a blow method and a stretching method, and among them, the melt extrusion method is preferred in obtaining a polarizing plate protecting film with excellent mechanical strength and high surface accuracy. The melt casting method in the invention comprises steps of heating the film formation composition until fluidity is developed to obtain a melt, and extruding the melt on a drum or an endless belt to form a web.

In the melt casting method, presence of volatile components in a composition for casting is undesirable in securing flatness and transparency of a film or a film useful for a polarizing plate protecting film. This is because incorporation of volatile components in the film lowers film transparency, or is likely to produce streaks in the film surface at extrusion from a die slit, lowering flatness. Accordingly, presence of components volatilizing at a temperature lower than a heat melt temperature at heat melting of the film formation composition is undesirable in preventing the volatile components during film manufacture.

As the volatile components, there are moisture, gas such as oxygen or nitrogen, solvents which originally exist in film constituents or is incorporated during preparation of the film constituents, and substances evaporated, sublimed or decomposition-volatilized by heating. The solvents herein referred to is not a solvent in a dope used in a solution casting method, and one contained in a minute amount in the film formation composition. Therefore, it is important in preventing volatile components from occurring to select the film constituents.

It is preferred that the volatile components such as moisture or solvents be removed before film formation or during heating from the film formation composition used in the melt casting method. Removing of the volatile components can be carried out by a drying method, for example, a heating method, a reduced pressure method or a heating and reduced pressure method. Drying may be carried out in air or in an atmosphere of inert gas such as nitrogen or argon. The content of water or oxygen in the inert gas is preferably less, and more preferably the inert gas does not substantially contain water or oxygen. The above drying method is preferably carried out at a temperature, which does not decompose the film constituents, for quality reasons. The residual moisture or solvent content of the film formation composition after the drying is preferably not more than 5% by weight, and more preferably not more than 1% by weight.

Particularly, a cellulose resin having a moisture content of less than 3% by weight is preferably used. The moisture content is determined according to ASTM-D817-96. It is more preferred that the cellulose resin be subjected to heat treatment to reduce the moisture content to 0.1 to 1000 ppm.

The film formation composition can be dried before manufacture of the film to reduce volatile components in it. In the film composition, the resin, one of constituents other than the resin, and a mixture of two or more kinds of the constituents can be dried separately. It is preferred that drying temperature is not less than 80° C., and not more than Tg of the constituents to be dried. Drying temperature is more preferably from 100 to (Tg-5)° C., and still more preferably from 110 to (Tg-20)° C., in preventing the fusion of the constituents. Drying period is preferably from 0.5 to 24 hours, more preferably from 1 to 18 hours, and still more preferably from 1.5 to 12 hours. The above drying time range is advantageous in removing effectively the volatile components and preventing the fusion of the constituents. Drying is carried out preferably at a pressure of not more than atmosphere, and more preferably at a pressure of from ½ atmosphere to vacuum. It is preferred that drying is carried out while stirring appropriately the film formation composition. A fluidized bed method, which carries out drying while introducing dried air or nitrogen into the drying chamber from the bottom, is especially preferred, since drying can be completed in a short time.

The drying can be divided into two or more steps. For example, the film constituents, which have been preliminarily dried and stored, is further dried immediately before film manufacture or within a week before film manufacture.

[Cellulose Resin]

The cellulose resin in the invention is preferably cellulose ester, in which a hydroxyl group at the 2, 3 or 6-position of cellulose combines with an aliphatic carboxylic acid or an aromatic carboxylic acid to form an ester bond.

In a cellulose aliphatic acid ester in which a hydrogen atom of a cellulose hydroxyl group is substituted with an aliphatic acyl group, the aliphatic acyl group is one having a carbon atom number of from 2 to 20. Examples of the aliphatic acyl group include acetyl-, propionyl, butyryl, isobutyryl, valeryl, pivaroyl, hexanoyl, octanoyl, lauroyl, and stearoyl.

In the invention, the aliphatic acyl group comprises those having a substituent. Examples of the substituent are the same as denoted as the substituent of the benzene ring in the aromatic acyl group described later.

In a cellulose aromatic acid ester, having an aromatic ring, the number of substituents of the aromatic ring is 0 to 5, preferably 1 to 3 substituents, and more preferably 1 or 2. When the aromatic ring has two or more substituents, the substituents may be the same or different, or may combine with each other to form a polycyclic ring (for example, naphthalene, indene, indane, phenanthrene, quinoline, isoquinoline, chromene, chroman, phthalazine, acridine, indole, indoline, etc.).

When the aromatic ring of the aromatic acyl group is a benzene ring, examples of substituents of the benzene ring include a halogen atom, a cyano group, an alkyl group, an alkoxy group, an aryl group, an aryloxy group, an acyl group, a carbonamide group, a sulfonamide group, a ureido group, an aralkyl group, a nitro group, an alkoxycarbonyl group, an aryloxycarbonyl group, an aralkyloxycarbonyl group, a carbamoyl group, a sulfamoyl group, an acyloxy group, an alkenyl group, an alkenyl group, an alkylsulfonyl group, an arylsulfonyl group, an alkyloxysulfonyl group, an aryloxysulfonyl group, an alkylsulfonyloxy group, an arylsulfonyloxy group, —SR, —NHCOOR, —PHR, —P(R)$_2$, —PHOR, —P(R) (OR), —P(OR)$_2$, —PH(=O)RP(=O)(R)$_2$, —PH(=O)—O—R, —P(=O)—(R)(OR), —P(=O)(OR)$_2$, —O—PH(=O)R, —OP(=O)(R)$_2$, —OPH(=O)(OR), —OP(=O)(R)(OR), —OP(=O)(OR)$_2$, —NH—PH(=O)—R, —NH—P(=O)(R)(OR), —NH—P(=O)(OR)$_2$, —SiH$_2$R, —SiH(R)$_2$, —Si(R)$_3$, —OSiH$_2$R, —OSiH(R)$_2$, and —OSi(R)$_3$, in which R represents an aliphatic group, an aromatic group, or a heterocyclic group. The number of the substituents is preferably from 1 to 5, more preferably from 1 to 4, still more preferably from 1 to 3, and most preferably 1 or 2. The substituent is preferably a halogen atom, a cyano group, an alkyl group, an alkoxy group, an aryl group, an aryloxy group, an acyl group, a carbonamide group, a sulfonamide group, or a ureido group, more preferably a halogen atom, a cyano group, an alkyl group, an alkoxy group, an aryloxy group, an acyl group, a carbonamide group, still more preferably a halogen atom, a cyano group, an alkyl group, an alkoxy group, an aryloxy group, and most preferably a halogen atom, an alkyl group, or an alkoxy group.

The halogen atom is fluorine, chlorine, bromine, or iodine. The alkyl group above may be cyclic or branched. The alkyl group has a carbon atom number of preferably from 1 to 20, more preferably from 1 to 12, still more preferably from 1 to 6, and most preferably from 1 to 4. Examples of the alkyl group include methyl, ethyl, propyl, isopropyl, butyl, t-butyl, hexyl, cyclohexyl, octyl and 2-ethylhexyl. The alkoxy group above may be cyclic or branched. The alkoxy group has a carbon atom number of preferably from 1 to 20, more preferably from 1 to 12, still more preferably from 1 to 6, and most preferably from 1 to 4. The alkoxy group may have another alkoxy group as a substituent. Examples of the alkoxy group include methoxy, ethoxy, 2-methoxyethoxy, 2-methoxy-2-ethoxyethoxy, propoxy, isopropyl, butyloxy, hexyloxy and octyloxy.

The aryl group has a carbon atom number of preferably from 6 to 20, and more preferably from 6 to 12. Examples of the aryl group include phenyl and naphthyl. The aryloxy group has a carbon atom number of preferably from 6 to 20, and more preferably from 6 to 12. Examples of the aryloxy group include phenoxy and naphthoxy. The acyl group has a carbon atom number of preferably from 1 to 20, and more preferably from 1 to 12. Examples of the acyl group include formyl, acetyl and benzoyl. The carbonamide group has a carbon atom number of preferably from 1 to 20, and more preferably from 1 to 12. Examples of the carbonamide group include acetoamide and benzamide. The sulfonamide group has a carbon atom number of preferably from 1 to 20, and more preferably from 1 to 12. Examples of the sulfonamide group include methanesulfonamide, benzenesulfonamide and p-toluenesulfonamide. The ureido group has a carbon atom number of preferably from 1 to 20, and more preferably from 1 to 12. Examples of the ureido group include ureido (unsubstituted).

The aralkyl group has a carbon atom number of preferably from 7 to 20, and more preferably from 7 to 12. Examples of the aralkyl group include benzyl, phenetyl, and naphthylmethyl. The alkoxycarbonyl group has a carbon atom number of preferably from 1 to 20, and more preferably from 2 to 12. Examples of the alkoxycarbonyl group include methoxycarbonyl. The aryloxycarbonyl group has a carbon atom number of preferably from 7 to 20, and more preferably from 7 to 12. Examples of the aryloxycarbonyl group include phenoxycarbonyl. The aralkyloxycarbonyl group has a carbon atom number of preferably from 8 to 20, and more preferably from 8 to 12. Examples of the aralkyloxycarbonyl group include benzyloxycarbonyl. The carbamoyl group has a carbon atom number of preferably from 1 to 20, and more preferably from 1 to 12. Examples of the carbamoyl group include carbamoyl (unsubstituted) and N-methylcarbamoyl. The sulfamoyl group has a carbon atom number of preferably not more than 20, and more preferably not more than 12. Examples of the sulfamoyl group include sulfamoyl (unsubstituted) and N-methylsulfamoyl. The acyloxy group has a carbon atom number of preferably from 1 to 20, and more preferably from 2 to 12. Examples of the acyloxy group include acyloxy and benzoyloxy.

The alkenyl group has a carbon atom number of preferably from 2 to 20, and more preferably from 2 to 12. Examples of the alkenyl group include vinyl, allyl, and isopropenyl. The alkinyl group has a carbon atom number of preferably from 2 to 20, and more preferably from 2 to 12. Examples of the alkinyl group include thienyl. The alkylsulfonyl group has a carbon atom number of preferably from 1 to 20, and more preferably from 1 to 12. The arylsulfonyl group has a carbon atom number of preferably from 6 to 20, and more preferably from 6 to 12. The alkyloxysulfonyl group has a carbon atom number of preferably from 1 to 20, and more preferably from 1 to 12. The aryloxysulfonyl group has a carbon atom number of preferably from 6 to 20, and more preferably from 6 to 12. The alkylsulfonyloxy group has a carbon atom number of preferably from 1 to 20, and more preferably from 1 to 12. The arylsulfonyloxy group has a carbon atom number of preferably from 6 to 20, and more preferably from 6 to 12.

The cellulose resin used in the invention is preferably at least one selected from the group consisting of cellulose acetate, cellulose propionate, cellulose butyrate, cellulose acetatepropionate, cellulose acetatebutyrate, cellulose acetatephthalate, and cellulose phthalate. Among these, cellulose acetate, cellulose propionate, cellulose butyrate, cellulose acetatepropionate, or cellulose acetatebutyrate is preferrede.

The cellulose resin used in the invention has an acyl substitution degree of from 2.5 to 2.9. An acyl substitution degree less than 2.5 provides phase difference which is likely to vary with time or depending on environmental conditions. An acyl substitution degree exceeding 2.9 is likely to cause rupture at hot stretching. Cellulose resin having an acetyl substitution degree of from 1.5 to 2.5 and a substitution degree of an acyl group with three or more carbon atoms of from 0.1 to 1.2 is preferred. Cellulose resin having an acetyl substitution degree of from 1.5 to 2.0 and a substitution degree of an acyl group with three or more carbon atoms of from 0.6 to 0.9 is more preferred.

Such a cellulose resin can be obtained according to a conventional method. For example, employing acetic acid anhydride, propionic acid anhydride, and/or butyric acid anhydride, hydrogen of the hydroxyl group of cellulose is substituted with an acetyl group, a propionyl-group and/or butyryl group to obtain the substitution degree range described above. Such a synthetic method of cellulose ester is not specifically limited but the cellulose ester can be synthesized according to methods disclosed in Japanese Patent O.P.I. Publication No. 10-45804, and Japanese Patent Application Open to Public Inspection under PCT Application No. 6-501040.

The substitution degree of an acyl group such as an acetyl group, a propionyl group or butyryl group in the cellulose ester can be determined according to ASTM-D817-96.

Materials for the cellulose resin in the invention may be tree pulp or cotton pulp, and the tree pulp may be softwood pulp or hardwood pulp, but is preferably softwood pulp. Cotton liter is preferably used in a peeling property during film manufacture. The cellulose resins made from the pulp may be used singly or in combination. It is preferred that the cellulose resins having a different acyl substitution degree are used in combination.

(Alkaline Earth Metal Content)

The alkaline earth metal content of the cellulose resin used in the invention is from 1 to 50 ppm. The alkaline earth metal content exceeding 50 ppm results in increase of contaminations at the lip or is likely to cause rupture at the slitting section during or after hot stretching. The alkaline earth metal content less than 1 ppm is also likely to cause rupture, but the reason is unclear. In order to reduce the alkaline earth metal content to less than 1 ppm, excessive burden is loaded at a washing step, and the alkaline earth metal content less than 1 ppm is undesirable in this point. The alkaline earth metal content of the cellulose resin is preferably from 1 to 30 ppm. The alkaline earth metal content herein referred to means a total content of Ca and Mg, and can be determined according to X-ray photoelectron spectrometry (XPS).

(Residual Sulfuric Acid Content)

The residual sulfuric acid herein refers to sulfuric acid remaining in cellulose resin (generally, cellulose ester) after the cellulose resin is manufactured in the presence of sulfuric acid as a catalyst. The residual sulfuric acid content of the cellulose resin used in the invention is from 0.1 to 45 ppm in terms of sulfur atom. The sulfuric acid is considered to exist in the form of a salt. The residual sulfuric acid content exceeding 45 ppm is undesirable since contamination at a die lip is increased during heat melting, and rupture is likely to be caused at slitting during or after hot stretching. The residual sulfuric acid content to less than 0.1 ppm is undesirable since excessive burden is loaded at a washing step, and rupture may be likely to be caused. This reason is considered due to increased washing frequencies influencing the cellulose resin but is not clear. The residual sulfuric acid content of the cellulose resin is preferably from 0.1 to 30 ppm. The residual sulfuric acid content of the cellulose resin can be determined according to ASTM-D817-96.

(Free Acid Content)

The free acid herein refers to an acid (for example, acetic acid, propionic acid or butyric acid) remaining unreacted in cellulose resin (generally, cellulose ester) after the cellulose resin is manufactured employing an esterification reaction or an acid (for example, acetic acid, propionic acid or butyric acid), which is released from the cellulose resin on heat melting the film formation composition in the heat melt casting method. The free acid content of the cellulose resin used in the invention is preferably from 1 to 500 ppm. The free acid content exceeding 500 ppm increases contaminations at the lip of a die and is likely to cause rupture. It is difficult to reduce the free acid content to less than 1 ppm by washing. The free acid content of the cellulose resin is preferably from 1 to 100 ppm since rupture is difficult to occur, and more preferably from 1 to 70 ppm. The free acid content of the cellulose resin can be determined according to ASTM-D817-96.

The number average molecular weight (Mn) of the cellulose resin in the invention is preferably from 50,000 to 250,000, more preferably from 60,000 to 220,000, and most preferably from 70,000 to 200,000. The weight average molecular weight (Mw) of the cellulose resin in the invention is preferably from 50,000 to 300,000, and more preferably from 100,000 to 250,000. A ratio, Mw/Mn is preferably from 1 to 5, and more preferably from 2.0 to 5.0.

Synthesized cellulose ester, which has been more sufficiently carried out as compared with cellulose ester used in the solution casting method to obtain the alkaline earth metal or residual sulfuric acid content range as described above, provides reduced contaminations at the lip during film manufacture according to a melt casting method and provides a film with excellent flatness and a film which is excellent in dimensional stability, mechanical strength, transparency, moisture resistance, Rt, and $R_0$.

The intrinsic viscosity of the cellulose resin is preferably from 1.5 to 1.75 dl/g, and more preferably from 1.53 to 1.63 dl/g. The intrinsic viscosity of the cellulose resin is obtained by measuring according to ASTM D817-96.

It is preferred that the film made of the cellulose resin in the invention has less luminescent foreign materials. In a composite comprising a first polarizing plate on a light source side, a second polarizing plate and a cellulose ester film provided between the first and second polarizing plates each arranged in a crossed Nicole, the transmission axis of the first polarizing plate being arranged parallel to the retardation phase axis of the cellulose ester film, such luminescent foreign materials are observed as light leaks when the composite is observed from the direction normal to the second polarizing plate surface. The polarizing plates used for evaluation are preferably those employing a protecting film having no luminescent foreign materials, and a protecting film protecting a polarizing film is preferably a glass plate. One element of occurrence of the luminescent foreign materials is considered due to the high content of a free OH of the cellulose ester in cellulose ester film. The luminescent foreign materials can be reduced by employing a cellulose resin having less luminescent foreign materials or by filtering the heat melt cellulose resin. Less thickness of the film reduces the number per unit area of luminescent foreign materials, and less content of cellulose resin in the film tends to reduce the number per unit area of luminescent foreign materials.

It is preferred that the number of luminescent foreign materials having a size of 5 to 50 µm per 250 mm² of the composite above be not more than 300 and the number of luminescent foreign materials having a size exceeding 50 µm per 250 mm² of the composite be 0. The number of luminescent foreign materials having a size of 5 to 50 µm per 250 mm of the composite is more preferably not more than 200.

A displaying image of a liquid crystal display is adversely affected by luminescent foreign materials. The polarizing plate protecting film in the invention functions also as an optical retardation film, presence of the luminescent foreign materials produces disorder of birefringence, and has an adverse affect on image quality of a liquid crystal display.

When luminescent foreign materials being removed by filtration, a melt casting method is carried out, it is preferred in minimizing deterioration of cellulose resin that the cellulose resin to be heat melted contains a stabilizer.

When a composition containing cellulose resin and a plasticizer described later, providing lower heat melt temperature as compared with a composition containing no plasticizer, is employed, a melt casting method comprising filtration of the melted composition in order to remove luminescent foreign materials is preferred, since removal efficiency of the luminescent foreign materials is increased, and heat decomposition is minimized. Further, a cellulose resin composition, further containing an ultraviolet absorbent or microparticles as other additives, can be also filtered.

As filtration materials, conventional ones such as glass fibers, heat resistant resins, and carbon fibers can be used but ceramics or metals are preferably used. The absolute filtration accuracy of filters is preferably not more than 50 µm, more preferably not more than 30 µm, still more preferably not more than 10 µm, and most preferably not more than 5 µm. These can be used in combination appropriately. The filtration materials may be of surface type or of depth type. The latter is preferably used in that clogging is difficult to occur.

Before a film formation composition for heat melt is prepared, a cellulose resin is dissolved in a solvent at a final stage of its preparation to form a cellulose resin solution and the solution can be filtered to remove luminescent foreign materials.

Filtration of the solution is more efficient as compared to that of heat melt composition, since the latter has higher viscosity.

When a cellulose resin solution in which the cellulose resin is dissolved in a solvent is prepared before a film formation composition for heat melt is prepared, it is preferred that the solution is added with the hindered amine compound or hindered phenol compound, a plasticizer, an ultraviolet absorbent, microparticles or others, filtered and dried by evaporating the solvent to obtain a solid composition. A heat melt composition containing cellulose resin can be obtained from the solid composition. As the solvents used, good solvents such as methylene chloride, methyl acetate, dioxolane use in the melt casting method can be used, and poor solvents such as methanol, ethanol or butanol can be simultaneously used.

Such a cellulose resin solution can be prepared through the step chilled at not more than −20° C., during dissolution of the cellulose resin in a solvent. Further, at least one of a stabilizer, a plasticizer or other additives is added to the cellulose resin as follows. The cellulose resin is dissolved in a solvent at any time before a final stage of its preparation to obtain a cellulose resin solution. The solution is filtered to remove luminescent foreign materials, and added with the stabilizer, the plasticizer or other additives. Subsequently, a solid composition may be separated from the resulting solution by evaporation of the solvents or by reprecipitation, and dried. The resulting composition is in the form of pellets to obtain a film formation composition.

The constituents other than the cellulose resin are uniformly mixed with the cellulose resin before heat melt, which provides uniform melt of the mixture at heat melt.

The total amount of stabilizer, plasticizer, or other additive added to the cellulose resin is preferably from 1 to 30% by weight, based on the weight of the cellulose resin.

The polarizing plate protecting film of the invention can contain a polymer or an oligomer other than the cellulose resin in the invention. Such a polymer or an oligomer is preferably one miscible with the cellulose resin. The polarizing plate protecting film of the invention has a transmittance of preferably not less than 80%, more preferably not less than 90%, and still more preferably not less than 92%. Mixing of the polymer or oligomer to the cellulose resin can facilitate viscosity control at heat melt and improve a physical property of a film manufactured.

It is preferred in the invention that before or during the film formation composition containing thermoplastic particles cellulose resin is heat melted, a hindered phenol or hindered amine compound be added thereto. The added amount of the hindered phenol compound or hindered amine compound is from 0.01 to 5% by weight based on the cellulose resin.

The polarizing plate protecting film of the invention preferably contains a stabilizer, an acid scavenger, a peroxide decomposing agent, a radical trapping agent, a metal inactivating agent, or amine. These agents are described in Japanese Patent O.P.I. Publication Nos. 3-199201, 5-197073, 5-194789, 5-271471 and 6-107854.

On heat melting the film constituents, decomposition reaction may occur, which may result in coloration or deterioration of film to be obtained. Further, undesired volatile components may generate by the decomposition.

The film constituents are stored as pellets containing one or more thereof in order to minimize deterioration and moisture absorption thereof, and a melt composition can be prepared employing the pellets. The pellets exhibit improved miscibility of the constituents on heat melting, which results in good optical uniformity of the film.

Haze of the polarizing plate protecting film of the invention is preferably less than 3%, more preferably less than 1%, still more preferably less than 0.3%, and most preferably less than 0.1%.

[Hindered Phenol Compound].

As the hindered phenol compound, there are 2,6-dialkylphenol compounds disclosed in columns 12 to 14 of U.S. Pat. No. 4,839,405. Such compounds include a compound represented by formula (1) below.

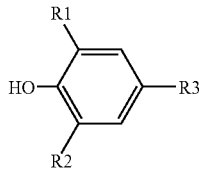

Formula (1)

Wherein $R_1$, $R_2$ and $R_3$ independently represent a substituted or unsubstituted alkyl group.

Examples of the hindered phenol compound include n-octadecyl 3-(3,5-di-t-butyl-4-hydroxyphenyl)propionate, n-octadecyl 3,5-di-t-butyl-4-hydroxyphenylacetate, n-octadecyl 3,5-di-t-butyl-4-hydroxybenzoate, n-hexyl 3,5-di-t-butyl-4-hydroxybenzoate, n-dodecyl 3,5-di-t-butyl-4-hydroxybenzoate, neo-dodecyl 3-(3,5-di-t-butyl-4-hydroxyphenyl)propionate, dodecyl β-(3,5-di-t-butyl-4-hydroxyphenyl)propionate, ethyl α-(4-hydroxy-3,5-di-t-butylphenyl)isobutyrate, octadecyl α-(4-hydroxy-3,5-di-t-butylphenyl)isobutyrate, octadecyl α-(4-hydroxy-3,5-di-t-butylphenyl)propionate, 2-n-octylthioethyl 3,5-di-t-butyl-4-hydroxybenzoate, 2-n-octylthioethyl 3,5-di-t-butyl-4-hydroxyphenylacetate, 2-(2-hydroxyethylthio)ethyl 3,5-di-t-butyl-4-hydroxybenzoate, diethyl glycol bis(3,5-di-t-butyl-4-hydroxyphenyl)propionate, 2-(n-octadecylthio)ethyl 3-(3,5-di-t-butyl-4-hydroxyphenyl)propionate, stearamide N,N-bis-[ethylene 3-(3,5-di-t-butyl-4-hydroxyphenyl)propionate], n-butylimino N,N-bis-[ethylene 3-(3,5-di-t-butyl-4-hydroxyphenyl)propionate], 2-(2-stearoyloxyethylthio)ethyl 3,5-di-t-butyl-4-hydroxybenzoate, 2-(2-srearoyloxyethylthio)ethyl 7-(3-methyl-5-t-butyl-4-hydroxyphenyl)heptanoate, 1,2-propylene glycol bis-[3-(3,5-di-t-butyl-4-hydroxyphenyl)propionate], ethylene glycol bis-[3-(3,5-di-t-butyl-4-hydroxyphenyl)propionate], neopentyl glycol bis-[3-(3,5-di-t-butyl-4-hydroxyphenyl)propionate], ethylene glycol bis-[3-(3,5-di-t-butyl-4-hydroxyphenyl)acetate], glycerin-1-n-octadecanoate-2,3-bis-(3,5-di-t-butyl-4-hydroxyphenylacetate), pentaerythritol tetrakis-[3-(3',5'-di-t-butyl-4'-hydroxyphenyl)propionate], 1,1,1-trimethylolethane tris-[3-(3,5-di-t-butyl-4-hydroxyphenyl)propionate], sorbitol hexa-[3-(3,5-di-t-butyl-4-hydroxyphenyl)propionate], 2-hydroxyethyl 7-(3-methyl-5-t-butyl-4-hydroxyphenyl) heptanoate, 2-stearoyloxyethyl 7-(3-methyl-5-t-butyl-4-hydroxyphenyl)heptanoate, and 1,6-n-hexanediol-bis-[(3',5'-di-t-butyl-4-hydroxyphenyl) propionate], and pentaerythritol tetrakis(3,5-di-t-butyl-4-hydroxyhydrocinnamate). The hindered phenol compounds of that type, for example, Irganox 1070 or Irganox 1010 each produced by Ciba Specialty Chemicals Co., Ltd., are available on the market.

[Hindered Amine Compound]

As the hindered amine compound used in the invention, there are 2,2,6,6-tetralkylpiperidine compounds disclosed in columns 5 to 11 of U.S. Pat. No. 4,619,966 or in columns 3 to 5 of U.S. Pat. No. 4,839,405, their acid salts and their metal complexes. Such compounds include a compound represented by formula (3) below.

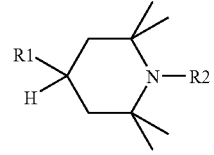

Formula (3)

wherein R1 and R2 independently represent a hydrogen atom or a substituent.

Examples of the hindered amine compound include 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, 1-(4-t-butyl-2-butenyl)-4-hydroxy-2,2,6,6-tetramethyl piperidine, 4-stearoyloxy-2,2,6,6-tetramethylpiperidine, 1-ethyl-4-salicyloyloxy-2,2,6,6-tetramethylpiperidine, 4-methacryloyloxy-1,2,2,6,6-pentamethylpiperidine, 1,2,2,6,6-pentamethylpiperidine-4-yl-β(3,5-di-t-butyl-4-hydroxyphenyl)propionate, 1-benzyl-2,2,6,6-tetramethyl-4-piperidinyl maleiate, (di-2,2,6,6-tetramethylpiperidine-4-yl) adipate, (di-2,2,6,6-tetramethylpiperidine-4-yl) sebacate, (di-1,2,3,6-tetramethyl-2,6-diethylpiperidine-4-yl) sebacate, (di-1-allyl-2,2,6,6-tetramethylpiperidine-4-yl) phthalate, 1-acetyl-2,2,6,6-tetramethylpiperidine-4-yl acetate, trimecillic acid tri-(2,2,6,6-tetramethylpiperidine-4-yl) ester, 1-acroylyl-4-benzyloxy-2,2,6,6-tetramethylpiperidine, dibutylmalonic acid di-(1,2,2,6,6-pentamethylpiperidine-4-yl) ester, dibenzylmalonic acid di-(1,2,3,6-tetramethylpiperidine-4-yl) ester, dimethyl-bis-(2,2,6,6-tetramethylpiperidine-4-oxy)-silane, tris-(1-propyl-2,2,6,6-tetramethylpiperidine-4-yl)-phosphite, tris-(1-propyl-2,2,6,6-tetramethylpiperidine-4-yl)-phosphate, N,N'-bis-(2,2,6,6-tetramethylpiperidine-4-yl)-hexamethylene-1,6-diacetamide, 1-acetyl-4-(N-cyclohexylacetoamido)-2,2,6,6-tetramethylpiperidine, 4-benzylamino-2,2,6,6-tetramethylpiperidine, N,N'-bis-[2,2,6,6-tetramethylpiperidine-4-yl]-N,N'-dicyclohexyl-(2-hydroxypropylene), N,N'-bis-[2,2,6,6-tetramethylpiperidine-4-yl]-p-xylylene diamine, 4-(bis-2-hydroxyethyl) amino-1,2,2,6,6-pentamethylpiperidine, 4-methacrylamide-1,2,2,6,6-pentamethylpiperidine, and α-cyano-β-methyl-β-[N-(2,2,6,6-tetramethylpiperidine-4-yl)]amino-acrylic acid methyl ester. Preferred examples of the hindered amine compound include HALS-1 and HALS-2 below, but the invention is not specifically limited thereto.

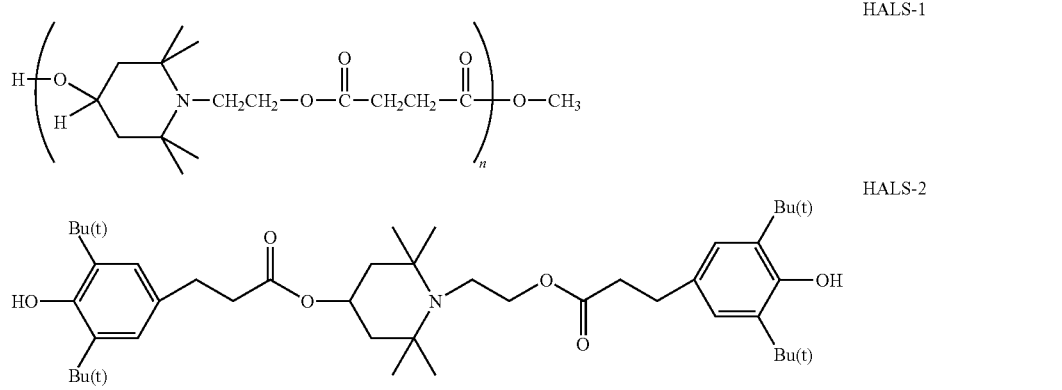

The above compound is preferably added to the cellulose resin, and the added amount of the compound is preferably from 0.01 to 5% by weight, more preferably from 0.01 to 3% by weight, and still more preferably from 0.01 to 0.8% by weight.

The above added amount range of the compound is advantageous in that thermal decomposition of the cellulose resin is difficult to occur, and high film transparency and high film flexibility are obtained in view of good miscibility with the cellulose resin.

In the invention, an acid scavenger useful for a compound used to stabilize the film constituents at heat melt is preferably an epoxy compound disclosed in U.S. Pat. No. 4,137,201. Example thereof include polyglycol diglycidyl ether, polyglycol derivative such as an adduct of 1 mol of polyglycol and 8 to 40 mol of ethylene oxide, glycerol diglycidyl ether, a metal epoxy compound (for example, those ordinarily used in the polyvinyl chloride composition), epoxidated ether condensation products, bisphenol A diglycidyl ether (for example, 4,4'-dihydroxydiphenyl-dimethylmethane), an epoxidated unsaturated fatty acid ester (an alkyl ester of fatty acid having a carbon atom number of from 2 to 22, the alkyl having a carbon atom number of from 2 to 4, for example, butyl epoxystearate), and epoxidated long chain fatty acid triglycerides (for example, epoxidated vegetable oil such as epoxidated soybean oil or other unsaturated natural oil, which are sometimes called epoxidized natural glyceride or unsaturated fatty acid, the fatty acid having a carbon atom number of from 12 to 22.). Epoxy group-containing epoxy resin compound EPON 815c available on the market, and an epoxidated ether oligomer represented by formula (2) below are especially preferred.

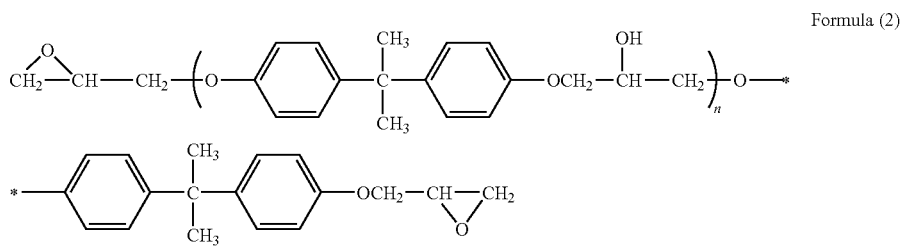

Formula (2)

wherein n represents an integer of from 0 to 12.

Other acid scavengers, which are disclosed in Japanese Patent O.P.I. Publication No. 5-194788, paragraphs 87 through 105, can be also used.

The acid scavenger content of the film formation composition is preferably from 0.001 to 5% by weight, and more preferably from 0.01 to 0.8% by weight.

[Plasticizer]

The polarizing plate protecting film in the invention contains a plasticizer in order to improve mechanical strength, to provide good flexibility and water resistance, and to reduce moisture permeation.

In the melt casting method in the invention, the plasticizer is added to lower the melt temperature of the film formation composition to a temperature lower than Tg of the cellulose resin and to provide a melt temperature of the film formation composition lower than that of the cellulose resin at a specific heat melt temperature.

Herein, the melt temperature of the film formation composition refers to a temperature at which the film formation composition exhibits fluidity.

The cellulose resin does not exhibit fluidity at a temperature lower than the Tg. The resin absorbs heat and reduces elasticity and viscosity at a temperature not lower than Tg to exhibit fluidity. In order to lower a melt temperature of the film formation composition, a plasticizer to be added to the composition preferably has a melting point or Tg lower than Tg of the cellulose resin.

The cellulose resin film used in the invention contains at least one plasticizer.

The plasticizer to be added is not specifically limited but a plasticizer having a low volatile temperature is preferred. Preferably, two or more kinds of plasticizer are added, which can reduce an amount of plasticizers to be added. Further, it is expected that the melt temperature lowers.

The plasticizer is not specifically limited, and polyhydric alcohol ester plasticizers, phthalates, citrates, polyesters, polyurethanes, glycolate plasticizers, and phosphate plasticizers are preferably used.

The polyhydric alcohol ester herein referred to implies an ester of an aliphatic polyhydric alcohol and monocarboxylic acids. The polyhydric alcohol ester preferably has in the molecule an aromatic ring or a cycloalkyl ring. The polyhydric alcohol ester is preferably an ester of an aliphatic polyhydric alcohol having two or more hydroxyl groups The polyhydric alcohol used in the invention is represented by the following formula (1):

$$R_1-(OH)n \quad \text{Formula (1)}$$

wherein $R_1$ represents an n-valent organic group, and n represents an integer of not less than 2.

Preferred examples of the polyhydric alcohol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,3,4-butanetriol, 1,5-pentanediol, 1,6-hexanediol, hexanetriol, galactitol, mannitol, 3-methylpentane-1,3,5-triol, pinacol, sorbitol, trimethylolpropane, trimetylolethane, and xylitol. Triethylene glycol, tetraethylene glycol, dipropylene glycol, tripropylene glycol, sorbitol, trimethylolpropane, and xylitol are especially preferable. The polyhydric alcohol has a carbon atom number of preferably not less than 4, more preferably from 5 to 60, and still more preferably from 6 to 30.

The monocarboxylic acids used for the preparation of the polyhydric alcohol ester in the invention are not specifically limited. The monocarboxylic acids include an aliphatic monocarboxylic acid, an alicyclic monocarboxylic acid, and an aromatic monocarboxylic acid, and an alicyclic monocarboxylic acid and an aromatic monocarboxylic acid are preferable in improving water vapor transmission rate and a retention property.

Preferred examples of the monocarboxylic acid include the compounds described later, but the present invention is not limited thereto.

The aliphatic monocarboxylic acid is a straight chained or branched fatty acid having a carbon atom number of preferably from 1 to 32, more preferably from 1 to 20, and most preferably from 1 to 10. Acetic acid is preferable in providing increased compatibility with cellulose ester, and a combined use of acetic acid and another monocarboxylic acid is more preferable.

Preferred examples of the aliphatic monocarboxylic acid include a saturated fatty acid such as acetic acid, propionic acid, butyric acid, valeric acid, caproic acid, enanthic acid, pelargonic acid, capric acid, 2-ethyl-hexane carboxylic acid, undecanoic acid, lauric acid, tridecanoic acid, myristic acid, pentadecanoic acid, palmitic acid, heptadecanoic acid, stearic acid, nonadecanoic acid, arachic acid, behenic acid, lignoceric acid, cerotic acid, heptacosanoic acid, montanic acid, melissic acid or lacceric acid; and an unsaturated fatty acid such as undecylenic acid, oleic acid, sorbic acid, linolic acid, linolenic acid or arachidonic acid. These include those having a substituent.

Preferred examples of the alicyclic monocarboxylic acid include cyclopentane carboxylic acid, cyclohexane carboxylic acid, cyclooctane carboxylic acid, and their derivatives.

Preferred examples of the aromatic monocarboxylic acid include benzoic acid, an alkyl-substituted benzoic acid such as toluic acid, an aromatic monocarboxylic acid having two or more benzene rings such as biphenyl carboxylic acid, naphthalene carboxylic acid, or tetrarin carboxylic acid and their derivatives. Benzoic acid is especially preferable.

The molecular weight of the polyhydric alcohol ester is not specifically limited, but is preferably from 300 to 5000, more preferably from 300 to 1500, and still more preferably from 350 to 750. The polyhydric alcohol ester with higher molecular weight is preferable in the retention property, and the polyhydric alcohol ester with lower molecular weight is preferably in water vapor transmission rate and its compatibility with cellulose ester.

The monocarboxylic acid fro the preparation of the polyhydric alcohol ester in the invention may be used singly or as a mixture or two or more kinds thereof. All the hydroxy groups of the polyhydric alcohol may be esterified or a part of the hydroxy groups of the polyhydric alcohol may be esterified to remain a free hydroxyl group.

Examples of the polyhydric alcohol ester in the invention will be exemplified below.

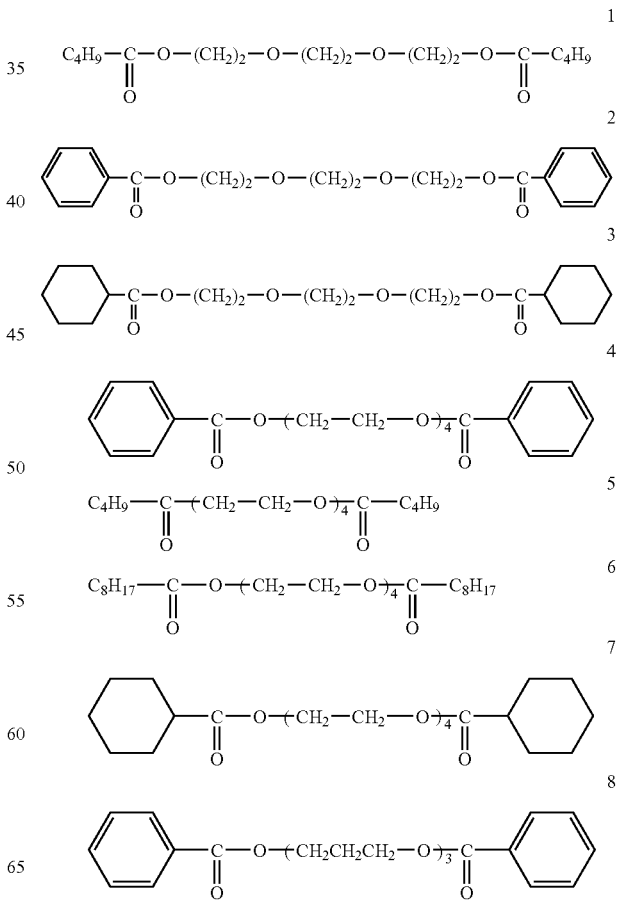

-continued
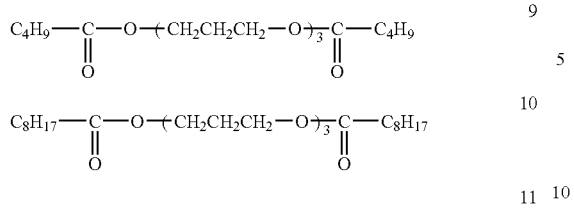
9
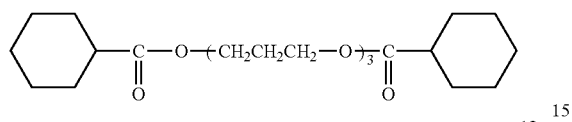
10
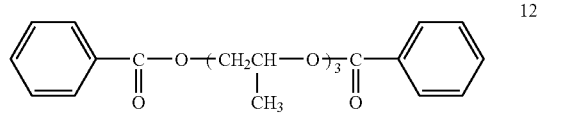
11
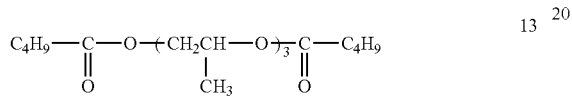
12
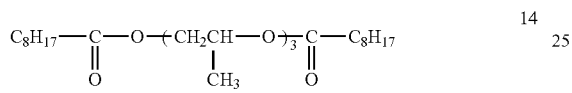
13
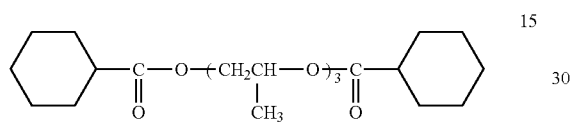
14
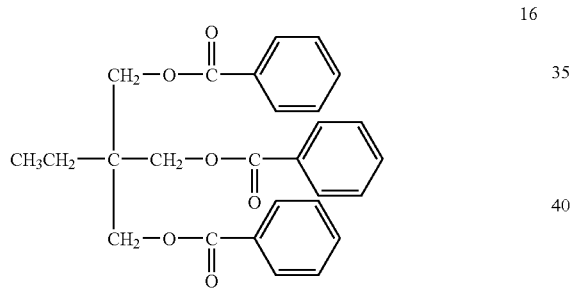
15
16
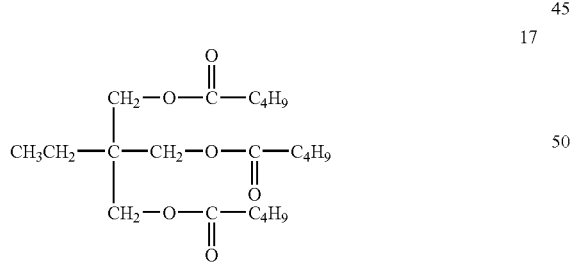
17
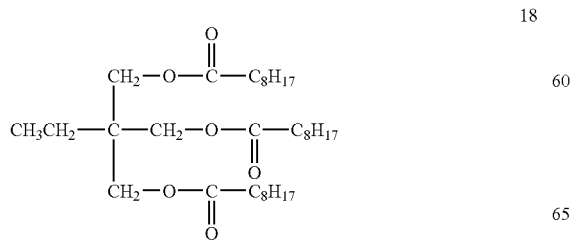
18
-continued
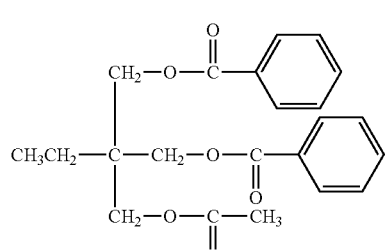
19
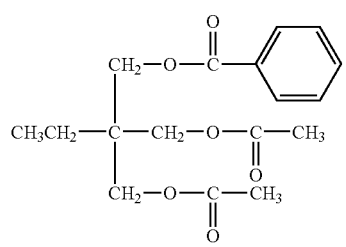
20
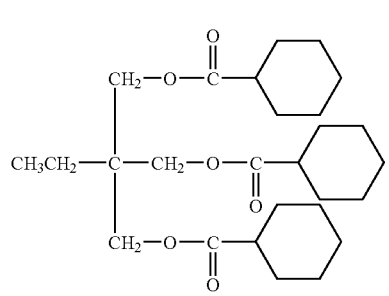
21
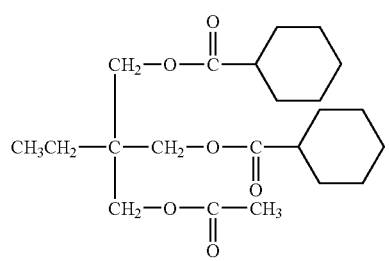
22
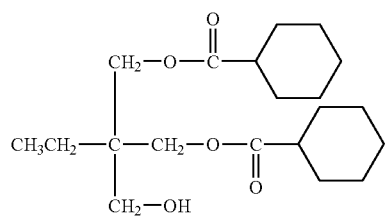
23

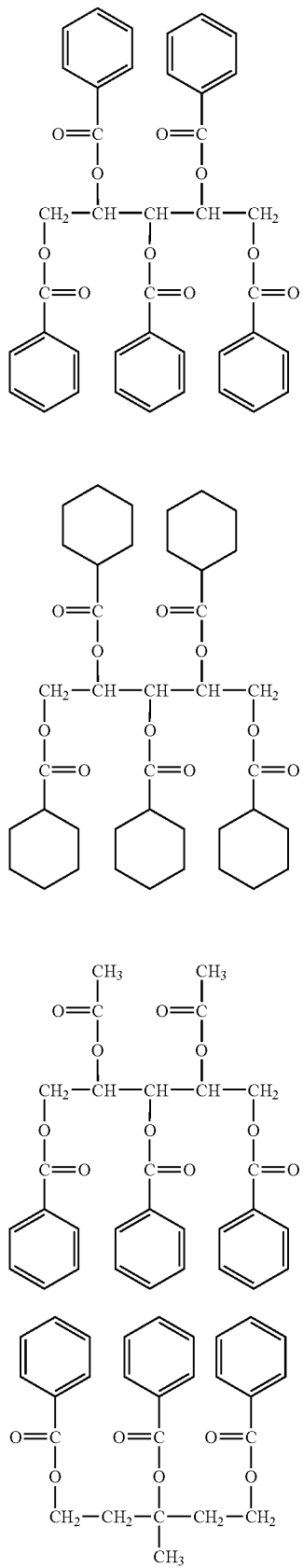
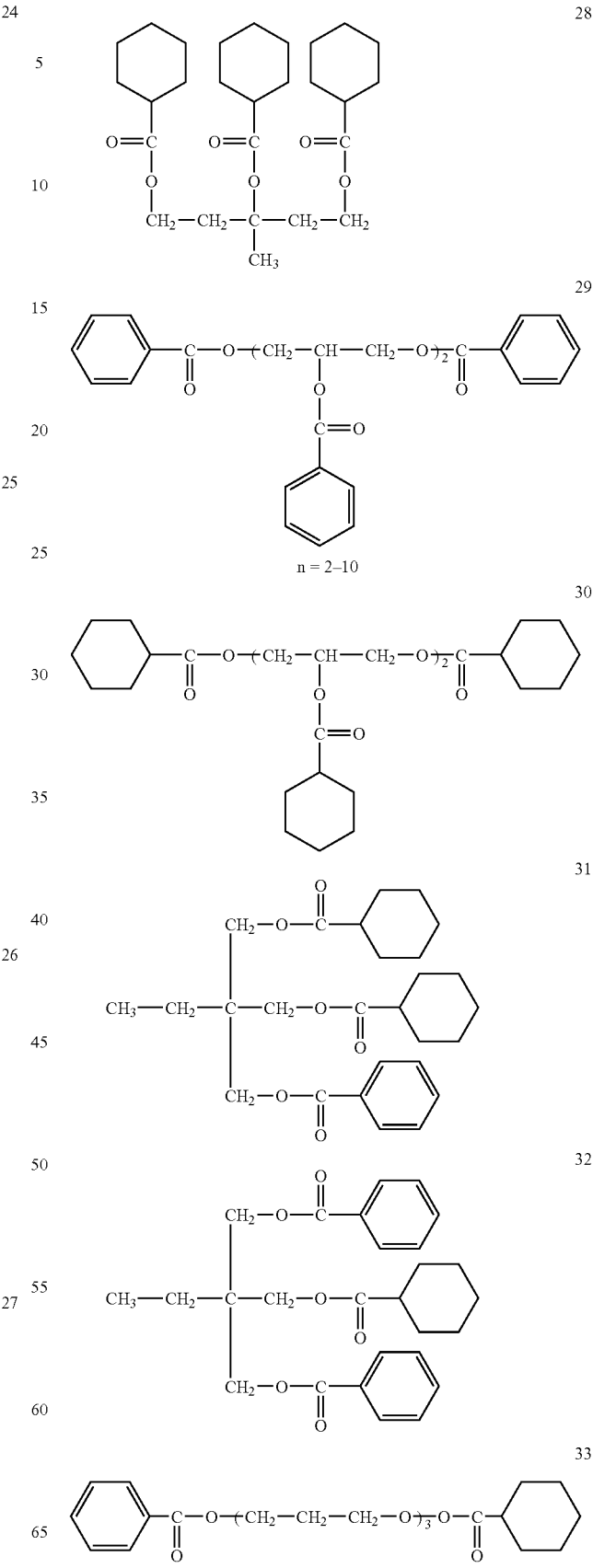

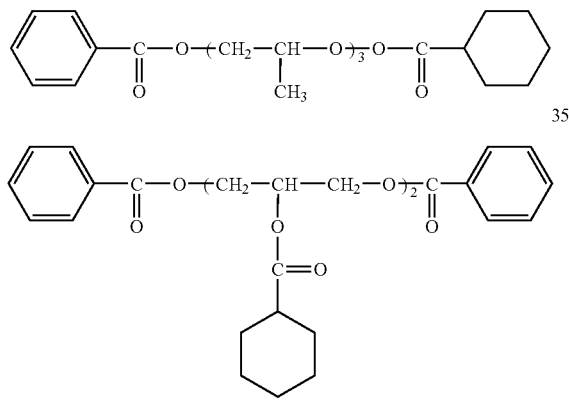

Glycolate plasticizers are not specifically limited, but alkyl phthalyl alkyl glycolates can be preferably used.

Listed as alkyl phthalyl alkyl glycolates are, for example, methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, methyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate, octyl phthalyl ethyl glycolate, and the like.

Listed as said citric acid esters may be, for example, acetyl trimethyl citrate, acetyl triethyl citrate, and acetyl tributyl acetate.

Examples of the fatty acid ester plasticizer include butyl oleate, methyl acetyl recinoleate, and dibutyl sebacate.

Listed as phosphoric acid esters may be, for example, triphenyl phosphate, tricresyl phosphate, cresyl diphenyl phosphate, phenyl diphenyl phosphate, octyl diphenyl phosphate, trioctyl phosphate, tributyl phosphate, and non-volatile phosphates (for example, arylene bis(diaryl phosphate) ester) disclosed in Japanese Patent Application Open to Public Inspection under PCT Application No. 6-501040. The content of the phosphate plasticizer in the film is preferably less than 40% by weight, based on the total content of plasticizers contained in the film. It is more preferred that the phosphate plasticizer is not substantially contained in the film. The passage "the phosphate plasticizer is not substantially contained in the film" implies that the film contains the phosphate plasticizer in an amount of preferably less than 1% by weight, and more preferably less than 0.1% by weight, or most preferably the film contains no phosphate plasticizer.

The content of the plasticizer in the polarizing plate protecting film is preferably from 5 to 30% by weight, more preferably from 6 to 20% by weight, and still more preferably from 8 to 15% by weight. When the polarizing plate protecting film contains two kinds of plasticizers, the content of each plasticizer is at least 1% by weight, and preferably at least 2% by weight.

The content of the polyhydric alcohol ester plasticizer in the polarizing plate protecting film is preferably from 1 to 20% by weight, and more preferably from 3 to 15% by weight. The above content range of the polyhydric alcohol ester plasticizer is preferred in view of film flatness or reduction of bleeding out. The content ratio of the polyhydric alcohol ester plasticizer to another plasticizer is preferably from 1:4 to 4:1, and more preferably from 1:3 to 3:1. The appropriate content range of the plasticizer in the film is preferred in good dimensional stability.

As the plasticizer can be used a polymer obtained by polymerization of an ethylenically unsaturated monomer having a weight average molecular weight of 500 to 10,000, an acryl polymer, or an acryl polymer having in the side chain an aromatic ring group or a cyclohexyl group, each being disclosed in. Japanese Patent O.P.I. Publication No. 2003-12859.

The content of these polymers is preferably from 0.5 to less than 20% by weight, and more preferably from 1 to less than 20% by weight, based on the amount of resin contained in the polarizing plate protecting film of the invention.

In the invention, when volatile components are produced on thermal decomposition of plasticizers in the film, a thermal decomposition temperature of plasticizer, at which 1% by weight of the plasticizers is decomposed, is defined as Td(1.0). Td(1.0) is preferably higher than a melt temperature (Tm) of a film formation composition, since the plasticizer, which usually has a content higher than other film constituents, has a great influence on film quality. The thermal decomposition temperature Td(1.0) can be measured employing a differential thermogravimetric analysis meter (TG-DTA) available on the market.

[Other Additives]

The polarizing plate protecting film of the invention preferably contains the following additives.

(Ultraviolet Absorbent)

A UV absorbent preferably has a superior absorbance in a wavelength range of 370 nm or less, in order to prevent deterioration of a polarizing element or a display under UV rays, and has a smaller absorbance in the visible light region at a wavelength range of 400 nm or more, in order to provide a superior image quality of a liquid crystal display. Examples of a UV absorbent used in the present invention include: oxybenzophenone compounds, benzotriazole compounds, salicylate compounds, benzophenone compounds, cyanoacrylate compounds, nickel complex compounds, and triazine compounds. Among these, benzophenone compounds, and benzotriazole compounds and triazine compounds, which exhibit negligible coloring, are specifically preferable. UV absorbents disclosed in JP-A Nos. 10-182621 and 8-337574, and a polymer UV absorbent disclosed in JP-A No. 6-148430 may be used.

Specific examples of a preferable benzotriazole UV absorbent include: 2-(2'-hydroxy-5'-methylphenyl) benzotriazole, 2-(2'-hydroxy-3',5'-di-tert-butylphenyl) benzotriazole, 2-(2'-hydroxy-3'-tert-butyl-5'-methylphenyl) benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl) benzotriazole, 2,2-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2H-benzotriazole-2-yl)-6-(normal chain and side chain dodecyl)-4-methylphenol, and a mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl) phenyl]propionate. However, the present invention is not limited thereto.

Commercially available Tinuvin 109, Tinuvin 171 and Tinuvin 326 (all produced by Ciba Specialty Chemicals Inc.) may also be preferably used.

Examples of benzophenone compounds include: 2,4-dihydroxybenzophenone, 2,2'-dihydroxy-4-methoxybenzophenone, 2-hydroxy-4-methoxy-5-sulfobenzophenone, and bis (2-methoxy-4-hydroxy-5-benzoylphenylmethane).

However, the present invention is not limited thereto.

In the invention, the polarizing plate protecting film contains the UV absorbent in an amount of preferably from 0.1 to 20% by weight, more preferably from 0.5 to 10% by weight, and still more preferably from 1 to 5% by weight. These UV absorbents may be used as an admixture of two or more kinds thereof.

(Microparticles)

The polarizing plate protecting film of the invention can contain microparticles in order to give to the film a sliding property, and optical and mechanical properties. The microparticles may be organic or inorganic.

The microparticles are preferably spherical, rod-shaped, acicular, layered, or planar. Examples of the microparticles include: (i) inorganic particles of metal oxides, phosphates, silicates such as silicon dioxide, titanium dioxide, aluminum oxide, zirconium oxide, calcium carbonate, kaolin, talc, calcinated calcium silicate, hydrated calcium silicate, aluminum silicate, a magnesium silicate, and calcium phosphate; and (ii) crosslinked polymer particles. Of these, silicon dioxide is specifically preferable because haze of the film may be decreased. The microparticles the surface of which is treated with an organic substance is preferred since haze of the film can be reduced.

The surface treatment is preferably carried out employing halosilanes, alkoxysilanes, silazane or siloxane. Microparticles with a larger mean particle diameter are preferable for improving slipping property, while a smaller mean particle diameter is preferable for improving transparency. The mean diameter of primary particles are usually 0.01 to 1.0 µm. The mean diameter of the primary particles of the microparticles is preferably 5 to 50 nm and more preferably 7 to 14 nm. The microparticles may be added to generate convexo-concave of 0.01 to 1.0 µm on the surface of a cellulose ester film. The content of the microparticles in the cellulose ester film is preferably 0.005 to 10% by weight based on the weight of cellulose ester.

Examples of microparticles of silicon dioxide include: Aerosil 200, 200V, 300, R972, R972V, R974, R202, R812, OX50 and TT600 (produced by Nippon Aerosil Co., Ltd.). Specifically, Aerosil 200V, R972, R972V, R974, R202 and R812 are preferably used. The above microparticles may also be used in combinations in an arbitrary ratio. Microparticles differ in mean particle diameter or in material properties may also be used together, for example, Aerosil 200V and R972V may be used together in a mixing ratio of 0.1:99.9 to 99.9:0.1 as a weight ratio.

Incorporation of these microparticles is preferably carried out after kneaded and incorporated into a film formation composition. As an alternative, microparticles and cellulose resin, optionally plasticizers or UV absorbents, are dispersed in a solvent to prepare a dispersion, followed by evaporation of the solvent from the dispersion or reprecipitation of the dispersion whereby solid components are obtained as a cellulose resin composition to be heat melted in the manufacture of film. The latter is preferred in that the microparticles can be uniformly dispersed in the cellulose resin.

The above microparticles can be added to improve mechanical, electrical and optical properties of film.

The polarizing plate protecting film in the invention can be added with additives to adjust the retardation. As such additives, aromatic compounds having two or more aromatic rings disclosed in European Patent No. 911,656 A2 can be used as a retardation adjusting agent. Two or more kinds of the aromatic compounds may be used. The aromatic ring of the aromatic compound is an aromatic hydrocarbon ring or an aromatic heterocyclic ring. The aromatic heterocyclic ring is preferred. The aromatic heterocyclic ring is generally an unsaturated heterocyclic ring. Compounds having a 1,3,5-triazine ring are especially preferred.

An optically anisotropic layer formed from a liquid crystal or polyimide can be provided on the polarizing plate protecting film in the invention and optimum optical compensation can be obtained by a combination of the polarizing plate protecting film and the optically anisotropic layer.

[Manufacturing Method of Polarizing Plate Protecting Film]

A manufacturing method of the polarizing plate protecting film of the invention will be detailed below, however this invention is not limited thereto. Herein, the longitudinal direction refers to the mechanical direction (long-length direction) and the lateral direction (transverse direction) refers to the direction normal to the mechanical direction.

A film formation composition including cellulose resin, which is preferably molded into pellet form, followed by hot air drying or vacuum drying, is heat-melted to obtain a melt. The melt is extruded from a die (a T die) to be in the form of sheet, cooled (for example, brought into contact with a cooling drum according to an electrostatic discharge method), to obtain a polarizing plate protecting film. Temperature for cooling is preferably maintained at 90 to 150° C.

The resulting film is peeled from the cooling drum. It is preferred that the peeled film be reheated via a heating device, such as a plural number of roller groups and/or an infrared ray heater, stretched in one step or multiple-steps in the longitudinal direction, and cooled. It is preferred that the film, when the glass transition temperature of the film is Tg, is heated at from (Tg−30)° C. to (Tg+100)° C., and preferably from (Tg−20)° C. to (Tg+80)° C., and stretched in the lateral or longitudinal direction. Preferably, the film is stretched in the lateral direction at (Tg−20)° C. to (Tg+20)° C., and thermally fixed. When the film is stretched laterally, such stretching is preferably performed in at least two divided stretching regions while successively increasing the temperature within a difference range of 1-50° C., which minimizes distribution of the thickness or optical properties across the width.

The film after stretched is preferably subjected to relaxation treatment.

Tg of film can be controlled by kinds of the film constitution components or the content ratio of the components. In the invention, Tg of the film is preferably not less than 120° C., and more preferably not less than 135° C. Further, Tg of the film is preferably not more than 250° C. The above Tg range of the film, when the polarizing plate protecting film of the invention film is used in a liquid crystal display, is preferred in providing less variation of retardation value, good dimensional stability and the ease of film manufacture. Tg of film can be determined according to a method described in JIS K7121.

In order to give a function of an optical retardation film to the polarizing plate protecting film of the invention, the refractive index is preferably controlled by stretching. The stretching will be explained below.

In the manufacture of the polarizing plate protecting film of the invention, $R_0$ and Rt can be controlled to fall within the range described above by stretching the cellulose resin film in one direction by a magnification of from 0.8 to 2.0 and in the direction in plane normal to the one direction by a magnification of from 1.01 to 2.5. The stretching may be divided in several steps while changing the stretching magnification or the temperature or may be simultaneously carried out in the both directions. In the invention, $R_0$ is preferably from 30 to 200 nm, and Rt is preferably from 70 to 400 nm.

For example, the film can be stretched in the longitudinal direction and in the direction (lateral direction) in plane normal to the longitudinal direction successively or simultaneously. In this case, too small stretching magnification in one direction provides insufficient optical retardation, while too much results in rupture of the film.

Stretching in the two directions crossing at right angles each other is effective to fall the refractive indices nx, ny and nz of film as defined in the following formula in the range in the invention.

$$R_0 = (nx-ny) \times d$$

$$Rt = \{(nx+ny)/2 - nz\} \times d$$

Wherein $R_0$ represents a retardation in plane of film, Rt represents a retardation in the thickness direction of film, nx represents a refractive index in the delayed phase direction in plane of film, ny represents a refractive index in the advanced phase direction in plane of film, nz represents a refractive index in the thickness direction of film, and d represents a thickness of film.

When film is stretched in the casting direction, too much contraction in the lateral direction of the film provides too large nz. In this case, improvement can be carried out by restraining contraction in the lateral direction of the film or by stretching the film in the lateral direction. When the film is stretched in the lateral direction, diversion of refractive index may be produced in the lateral direction. This phenomenon is sometimes found in a tenter method, and is considered to be due to so-called bowing phenomenon, which is caused by the fact that the film center shrinks and the film edges are fixed. In this case also, the bowing phenomenon is restrained by stretching the film in the casting direction, whereby diversion of refractive index in the lateral direction is minimized and improved.

Further, stretching in the two directions crossing at right angles each other can minimize variation of film thickness. Too much variation of film thickness causes unevenness of the optical retardation, resulting in color unevenness of images of a liquid crystal display.

Variation of thickness of cellulose ester film is preferably in the range within preferably ±3%, more preferably ±1%, and still more preferably ±0.1%.

In order to meet the requirements described above, stretching in the two directions crossing at right angles each other is effective, wherein finally, the film is stretched in the casting direction by a magnification of preferably from 1.0 to 2.0, and more preferably from 1.01 to 1.5, and in the lateral direction by a magnification of preferably from 1.01 to 2.5, and more preferably from 1.2 to 2.0, whereby the retardation in the invention of the film can be obtained. Temperature at stretching is preferably from 80 to 200° C., and more preferably from 90 to 180° C.

When a polarizing film, which is adhered to the polarizing plate protecting film of the invention, has an absorption axis in the longitudinal direction, the transmission axis of the polarizing film is in accordance with the lateral direction. The polarizing plate protecting film of the invention preferably has a delayed phase axis in the longitudinal or lateral direction, and more preferably has a delayed phase axis in the lateral direction.

When the cellulose resin providing a positive birefringence to stress is employed, stretching in the lateral direction can give the delayed phase axis to the lateral direction of the film.

In order to improve display quality, the delayed phase axis is preferably in accordance with the lateral direction of film, and in order to obtain the retardation range in the invention, it is necessary to meet the relationship (stretching magnification in the lateral direction)>(stretching magnification in the casting direction). It is required that R0 and Rt are difficult to vary depending on variation of temperature or humidity. Variation of R0 and Rt are preferably not more than 1 nm/° C., is preferably not more than 2 nm/% RH.

The web stretching method is not specifically limited. As the stretching method, there are a method stretching film in the longitudinal direction employing plural rollers having a different circumferential speed, a method stretching film in the longitudinal direction by pulling clips or pins fixing the film edges in the longitudinal direction, a method stretching film in the lateral direction by pulling clips or pins fixing the film edges in the lateral direction, and a method stretching film in the lateral direction and at the same time shrinking the film in the longitudinal direction by pulling simultaneously clips or pins fixing the film edges in the longitudinal and lateral directions. These methods may be used in combination. In a tenter method, when the clips are driven by a linear drive method, smooth stretching of film can be conducted, overcoming problems such as rupture of film.

In the film manufacture, holding of the film width or stretching in the lateral direction may be carried out employing a tenter, and the tenter may be a pin tenter or a clip tenter.

The thickness of the polarizing plate protecting film of the invention is preferably from 10 to 500 μm, more preferably from 20 to 150 μm, still more preferably from 35 to 120 μm, and most preferably from 25 to 90 μm. The above range of the thickness is preferred in weight reduction of a liquid crystal display, development of retardation as an optical retardation film and moisture resistance.

The large film thickness increases the drying load in a solution casting method, however, in the invention, a film with a large thickness can be efficiently manufactured, since a drying step evaporating solvents are eliminated. The present invention can easily manufacture a film increasing the thickness depending upon objects of providing necessary optical retardation or moisture resistance.

The width of the polarizing plate protecting film of the invention is preferably from 1 to 4 m, and more preferably from 1.4 to 4 m. The width of the polarizing plate protecting film of the invention is preferably from 500 to 5000 m, and more preferably from 1000 to 5000 m. A knurling with a thickness of from 0 to 25% of the film is provided on the both edges of the film, and then the film is wound around a spool.

When the angle between the delayed or advanced phase axis and the longitudinal direction in the polarizing plate protecting film of the invention is defined as θ1, θ1 is preferably from −1 to +1°, more preferably from −0.5 to +0.5°, and still more preferably from −0.1 to +0.1°.

This θ1 can be also defined as an orientation angle, and determined employing an automatic birefringence meter KOBRA-21ADH (produced by Oji Keisoku Co., Ltd.).

The above range of θ1 provides high luminance, minimized light leakage, and high color reproduction of displayed images in a color liquid crystal display.

When the polarizing plate protecting film of the invention is used in a multi-domain type VA mode, the film is arranged so that the advanced phase axis of the film is in the above range of θ1, whereby image quality is improved. When the film is used in a polarizing plate or liquid crystal display of MVA mode type, the polarizing plate and liquid crystal display of MVA mode type can have the structure as shown in FIG. 1.

Variation of the retardation in plane $R_0$ of the cellulose ester film is preferably not more than 5%, more preferably not more than 2%, and still more preferably not more than 1.5%. Variation of the retardation in the thickness direction Rt of the cellulose ester film is preferably not more than 10%, more preferably not more than 2%, and still more preferably not more than 1.5%.

With variation of the retardation, retardations are measured at points in the width direction which are 1 cm distant from each other, and coefficient of variation (CV) of the resulting retardations are determined. Standard deviation of the resulting retardations was obtained according to a (n-1) method. Regarding variation of the retardation, a coefficient of variation (CV) of the retardation is determined, which is represented by the following formula:

Coefficient of variation (CV) of the retardation=Standard deviation/Average of retardations The polarizing plate protecting film of the invention has preferably less coefficient of variation of retardation. The less coefficient of variation of retardation minimizes color unevenness of formed images in a liquid crystal display.

The polarizing plate protecting film of the invention may have wavelength dispersion property of retardation, and when the film is used in a liquid crystal display, the wavelength dispersion property of retardation is appropriately selected so that the display exhibits excellent image quality. Herein, as in $R_0$ at 590 nm of the optical retardation film, retardation in plane at 450 nm is defined as $R_{450}$, and retardation in plane at 650 nm as $R_{650}$.

When the polarizing plate protecting film is used in a MVA display described later, wavelength dispersion property of retardation in plane of the film is preferably $0.7<(R_{450}/R_0)<1.0$ and $1.0<(R_{650}/R_0)<1.5$, more preferably $0.7<(R_{450}/R_0)<0.95$ and $1.01<(R_{650}/R_0)<1.2$, and still more preferably $0.8<(R_{450}/R_0)<0.93$ and $1.02<(R_{650}/R_0)<1.1$, which provides excellent color reproduction of formed images in a liquid crystal display.

The polarizing plate protecting film of the invention is adjusted to give retardation improving display quality of a VA mode or TN mode liquid crystal display. The polarizing plate protecting film is preferably used in a multi-domain divided MVA mode as described above. It is necessary herein that $R_0$ be from 30 to 200 nm and Rt be from 70 to 400 nm.

When in a liquid crystal display two polarizing plates are provided in a crossed Nicol state on both sides of the liquid crystal cell, for example, as shown in FIG. 1, the above retardation range in plane mainly compensates light leak produced due to deviation from the crossed Nicole state observed from a direction (oblique direction) inclined from the direction normal to the display surface. When the liquid crystal cell of the above TN mode, VA mode, particularly MVA mode exhibits black display, the above retardation range in the film thickness direction mainly compensates birefringence of the liquid crystal cell observed from the oblique direction. A combination of the above two $R_0$ and Rt attains optical compensation. In the invention, $R_0$ and Rt can be adjusted to the retardation of a liquid crystal display itself.

When a liquid crystal cell in a liquid crystal display has a structure that a polarizing plate is provided on both sides of the liquid crystal cell, it is preferred that each of films 2a and 2b in FIG. 1 has Rt falling within the range described above, and the sum of Rt of films 2a and 2b is in the range of from 140 to 500 nm. Herein, $R_0$ and Rt of films 2a and 2b may be the same or different. It is preferred that a liquid crystal display comprising an MVA mode liquid crystal cell has a structure as shown in FIG. 1, wherein $R_0$ is from 30 to 200 nm and Rt is from 70 to 400 nm, and preferably $R_0$ is from 35 to 65 nm and Rt is from 90 to 180 nm. $Rt/R_9$ is preferably from 2 to 6.

When a polarizing plate comprising the polarizing plate protecting film of the invention is applied to a liquid crystal display, the polarizing plate of the invention is provided preferably on one surface of the liquid crystal cell, and more preferably on both surfaces of the liquid crystal cell. When the polarizing plate of the invention is provided on one surface of the liquid crystal cell, a polarizing plate comprising a conventional polarizing plate protecting film can be used on the other surface of the liquid crystal cell. As the conventional polarizing plate protecting film is used a cellulose ester film having an $R_0$ of preferably 0 to 4 nm, an Rt of preferably 20 to 60 nm, and a thickness of preferably 35 to 85 nm. For example, in FIG. 1, 2b is that cellulose ester film, and 2a is the polarizing plate protecting film of the invention or 2b is the polarizing plate protecting film of the invention, and 2a is that cellulose ester film. Herein, it is preferred in displaying quality and productivity that the polarizing plate protecting film of the invention has an $R_0$ of 30 to 200 nm, an Rt of preferably 70 to 400 nm.

As the conventional polarizing plate protecting film, Konicaminolta TAC KC8UX, KC4UX, KC5UX, KC8UY, KC4UY, KC8UCR-3, KC8UCR-4, KC12UR, KC8UXW-H, KC8UYW-HA, KC8UX-RHA (each produced by Konicaminolta Opt Co., Ltd.) are used. The polarizing plate protecting film of the invention can be preferably used in 1a or 1b as well as in at least one of 2a and 2b.

In the polarizing plate of the invention, another functional layer can be provided on the polarizing plate protecting film, which is provided on the surface of the polarizing film opposite the optical retardation film, in improving displaying quality of a display.

For example, a film comprising a functional layer such as an antireflection layer, an anti-glare layer, an anti-scratch layer, a dust preventing layer, a luminance improving layer, which is a known layer used in a display, may be provided on the polarizing plate protecting film.

In the optical retardation film, variation of the above-described retardation $R_0$ and Rt is required to be less in securing the stable optical properties. Particularly in a birefringence mode liquid crystal display, the variation may be the cause producing image unevenness.

A long-length polarizing plate protecting film manufactured according to a solution casting method may denature according to evaporation of organic solvents resided in a minute amount in the film. This long-length polarizing plate protecting film is manufactured in the roll form, stored and transported. Then, a polarizing plate is manufactured by a polarizing plate manufacturer employing the long-length polarizing plate protecting film. Accordingly, when a residual solvent exists in the film, the solvent near the roll center is difficult to volatize, and the solvent amount in the film differs from the outside to the inside of the roll and from the edges to the center in the width direction, which may result in variation of retardation with time.

The long-length polarizing plate protecting film of the invention is manufactured according to a melt casting method and is free from solvents unlike the solvent casting method, which is advantageous in less variation. The present invention is advantageous in that a long-length polarizing plate protecting film is obtained by stretching continuously a film manufactured according to the melt casting method.

The long-length polarizing plate protecting film according to a melt casting method is made mainly of cellulose resin, and can be subjected to saponification. The polarizing plate protecting film adheres to a polyvinyl alcohol polarizing film through an aqueous adhesive, and a conventional polarizing plate manufacturing method applies and roll to roll lamination is possible, which is advantageous in that a long-length polarizing plate in the roll form can be obtained.

The desired effect as above is exhibited particularly in a 100 m or more long film roll, and a longer length roll such as a 1500 m, 2500 m or 500 m roll exhibits more desired effect.

In the polarizing plate protecting film of the invention, the length of the roll film is from 100 to 5000 m, and preferably from 500 to 4500 m, in view of productivity and transportability. The width of the roll film is selected to meet the width of a polarizing film or that of a manufacturing line. The polarizing plate protecting film may be (a) manufactured in a width of from 1 to 4.0 m, and preferably from 1.4 to 3.0 m, and wound around a spool; (b) manufactured in a width two or more times the intended width, wound around a spool, and then cut into the intended width; or (c) manufactured in a width two or more times the intended width, wound around a spool, and wound around a spool while cutting into the intended width.

The polarizing plate protecting film of the invention, during or after stretching in the manufacture, is coated with a functional layer, for example, an anti-static layer, a hard coat layer, a lubricating layer, an adhesion layer, a gas-barrier layer, an anti-humidity layer, an anti-glare layer, a barrier layer, or an optically anisotropic layer such as a liquid crystal layer or a polyimide layer. On coating, the polarizing plate protecting film may be subjected to surface treatment such as corona discharge, plasma processing, or chemical processing such as alkali processing.

Compositions comprising cellulose resin containing the additives such as the plasticizer, ultraviolet absorbent or matting agent, the content in the compositions of the additives being different, are co-extruded on a support to obtain a cellulose ester film having a laminating structure. For example, cellulose ester film having the structure, a skin layer/a core layer/a skin layer can be manufactured also. Microparticles such as matting agents can be incorporated in the skin layer in an amount more than another layer or only in the skin layer. Plasticizers or ultraviolet absorbents can be incorporated in the core layer in an amount more than the skin layer or only in the core layer. Plasticizers and ultraviolet absorbents in the skin layer may be different from those in the core layer. For example, plasticizers of low volatilization and/or ultraviolet absorbents are added to the skin layer, while plasticizers with excellent plasticization and/or ultraviolet absorbents with high ultraviolet absorption to the core layer. The glass transition temperature of the skin layer may be different from that of the core layer, or the glass transition temperature of the skin layer may be higher than that of the core layer. In the melt casting method, viscosity of a melt composition containing cellulose ester for the skin layer may be different from that for the core layer, or that for the skin may be higher than or not higher than that for the core layer.

In the polarizing plate protecting film of the invention, variation of the film dimension is preferably within the range of ±0.5%, more preferably within the range of ±0.2%, and still more preferably within the range of ±0.1%, after the film has been allowed to stand at 80° C. and at 90% for 24 hours, based on the film dimension after the film has been allowed to stand at 23° C. and at 55% RH for 24 hours.

A manufacturing method of the polarizing plate of the invention is not specifically limited and can be carried out employing a conventional method. The polarizing plate protecting film is alkali treated, and is laminated through a completely saponified polyvinyl alcohol on both sides of a polarizing film which is obtained by immersing a polyvinyl alcohol film in an iodine solution and stretching. This method is advantageous in that the polarizing plate protecting film can be directly laminated at least one surface of a polarizing film.

Lamination processing disclosed in Japanese Patent O.P.I. Publication Nos. 6-94915 and 6-118232 can be applied instead of the alkali treatment to manufacture a polarizing plate.

The polarizing plate is comprised of a polarizing film and a polarizing plate protecting film provided on both surfaces of the polarizing plate. The polarizing plate may have further a protect film on one surface, and a separate film on the other surface. The protect film or separate film is provided in order to protect the polarizing plate at shipment or transportation. The protect film is provided in order to protect the polarizing plate and on the surface of the polarizing plate opposite a liquid crystal cell. The separate film is provided in order to cover an adhesive layer.

(Liquid Crystal Display)

A liquid crystal display comprising a polarizing plate having the polarizing plate protecting film of the invention provides high image displaying quality as compared a liquid crystal display comprising a conventional polarizing plate. The polarizing plate protecting film of the invention is more effectively employed specifically in a multi-domain mode liquid crystal display, and more preferably in a birefringent multi domain liquid crystal display.

A multi domain mode is also suitable for improving symmetry of an image and various method have been reported. For example: "Okita, and Yamauchi, Liquid Crystal, 6(3), 303 (2002)". The liquid crystal cell has also been introduced, for example, in "Yamada, and Yamahara, Liquid Crystal, 7(2), 184 (2003)", however, the present invention is not limited thereto.

The present invention may be effectively employed in the liquid crystal displays of the following modes, for example: (i) a MVA (Multi-domain Vertical Alignment) mode which is one of typical examples of the vertical alignment mode, specifically a 4-domain MVA mode; (ii) a PVA (Patterned Vertical Alignment) mode which is multi-domained by patterned electrodes; and (iii) a CPA (Continuous Pinwheel Alignment) mode in which a Chiral force and patterned electrodes are merged. Use of an optically biaxial film in an OCB (Optically Compensated Bend) has been proposed in "T. Miyashita, T. Uchida, J. SID, 3(1), 29 (1995)" in which the polarizing plate of the present invention may be employed to exhibit the effect of the present invention, namely, an improvement of image quality. The order of stacking of polarizing plates and the type of liquid crystal mode is not limited, provided that the effect of the present invention is obtained by using the polarizing plate of the present invention.

The image of a display is preferably symmetrical when observed. Accordingly, formation of multi-domain may be carried out while giving priority in keeping symmetry on the observation side of the display. Multi-domain formation is carried out using a method known in the prior art and the number of divided domains, for example, two or four may be determined depending on the properties of each liquid crystal mode.

Liquid crystal displays have been used as color displays and as moving picture displays. The improvement in image quality attained by the present invention enables displaying a moving picture without eye strain while giving real images due to the improved contrast and the improved durability of the polarizing plate.

The liquid crystal cell of the invention comprises a liquid crystal cell and a polarizing plate with the polarizing plate protecting film of the invention, the polarizing plate being provided on at least one surface of the liquid crystal cell. It is preferred in improving the displaying quality that in the liquid crystal cell, the polarizing plate is arranged on the liquid crystal cell so that the polarizing plate protecting film faces the liquid crystal cell surface. In FIG. 1, each of 2a and 2b, which serve as an optical retardation film, is preferably the polarizing plate protecting film of the invention. In this structure, the polarizing plate protecting film can optically compensate the liquid crystal cell. When the polarizing plate of the invention is used in a liquid crystal display, at least one of the polarizing plates in the liquid crystal display is the polarizing plate of the invention. The polarizing plate of the invention can provide a liquid crystal display with high displaying quality and a wide viewing angle property.

EXAMPLES

Next, the present invention will be explained employing examples, but is not limited thereto. The term, "parts" represents parts by weight, unless otherwise specified.

(Measurement of $R_0$ and $Rt$)

After a film was allowed to stand at 23° C. and at 55% RH for 24 hours, a retardation at a wavelength 590 nm of the film was measured at 23° C. and at 55% RH by means of an automatic birefringence meter KOBRA-21ADH (produced by Oji Keisokukiki Co., Ltd.). Employing an average refractive index of the film measured by an Abbe's refractometer and the film thickness (d), a retardation in plane $R_0$ and a retardation in the thickness direction Rt of the film were determined. Further, refractive indices in the three axis directions, nx, ny, and nz of the film were determined by means of the above meter.

$$R_0 = (nx - ny) \times d \quad \text{Formula (1)}$$

$$Rt = \{(nx+ny)/2 - nz\} \times d \quad \text{Formula (2)}$$

wherein nx represents a refractive index in the delayed phase axis direction in plain of film, ny represents a refractive index in the advanced phase axis direction in plane of film, nz represents a refractive index in the thickness direction of film, and d represents a thickness (nm) of film.

(Haze)

The haze of the film was determined employing a haze meter 1001DP TYPE (produced by Nippon Denshoku Co., Ltd.

(Tg)

Ten milligrams of sample, which was cut in small pieces, was placed in a sample pan and dried for 24 hours or more under vacuum. Tg of the resulting sample was measured under nitrogen atmosphere according to differential scanning colorimetry (DSC) employing a differential scanning calorimeter DSC 8230 type (produced by Rigaku Co., Ltd.) while elevating temperature from room temperature to 300° C. at a temperature elevating speed of 10° C. per minute. Tg was defined as a temperature at which the DSC curve began deviating from the base line.

(Materials)

<Cellulose Resin>

Cellulose resin 1:

Cellulose acetate propionate having an acetyl substitution degree of 1.75, a propionyl substitution degree of 0.80, an alkali earth metal content of 15 ppm, a sulfuric acid content (in terms of sulfur) of 15 ppm, a free acid content of 20 ppm, and an intrinsic viscosity of 1.54 dl/g Cellulose resin 2:

Cellulose acetate propionate having an acetyl substitution degree of 1.92, a propionyl substitution degree of 0.76, an alkali earth metal content of 15 ppm, a sulfuric acid content (in terms of sulfur) of 15 ppm, a free acid content of 20 ppm, and an intrinsic viscosity of 1.61 dl/g.

Cellulose resin 3:

Cellulose acetate propionate having an acetyl substitution degree of 1.94, a propionyl substitution degree of 0.63, an alkali earth metal content of 8 ppm, a sulfuric acid content (in terms of sulfur) of 25 ppm, a free acid content of 70 ppm, and an intrinsic viscosity of 1.54 dl/g.

Cellulose resin 4:

Cellulose acetate propionate having an acetyl substitution degree of 2.11, a propionyl substitution degree of 0.70, an alkali earth metal content of 30 ppm, a sulfuric acid content (in terms of sulfur) of 45 ppm, a free acid content of 70 ppm, and an intrinsic viscosity of 1.73 dl/g.

Cellulose resin 5:

Cellulose acetate propionate having an acetyl substitution degree of 1.92, a propionyl substitution degree of 0.70, an alkali earth metal content of 6 ppm, a sulfuric acid content (in terms of sulfur) of 12 ppm, a free acid content of 20 ppm, and an intrinsic viscosity of 1.59 dl/g.

Cellulose resin 6:

Cellulose acetate propionate having an acetyl substitution degree of 2.10, a propionyl substitution degree of 0.82, an alkali earth metal content of 105 ppm, a sulfuric acid content (in terms of sulfur) of 80 ppm, a free acid content of 510 ppm, and an intrinsic viscosity of 1.61 dl/g.

Cellulose resin 7:

Cellulose acetate propionate having an acetyl substitution degree of 1.60, a propionyl substitution degree of 0.82, an alkali earth metal content of 100 ppm, a sulfuric acid content (in terms of sulfur) of 70 ppm, a free acid content of 200 ppm, and an intrinsic viscosity of 1.5 dl/g.

Cellulose resin 8:

Cellulose acetate propionate having an acetyl substitution degree of 1.75, a propionyl substitution degree of 0.80, an alkali earth metal content of 55 ppm, a sulfuric acid content (in terms of sulfur) of 60 ppm, a free acid content of 110 ppm, and an intrinsic viscosity of 1.57 dl/g.

Cellulose resin 9:

Cellulose acetate butyrate having an acetyl substitution degree of 2.0, a butyryl substitution degree of 0.70, an alkali earth metal content of 3 ppm, a sulfuric acid content (in terms of sulfur) of 1 ppm, a free acid content of 20 ppm, and an intrinsic viscosity of 1.6 dl/g.

Cellulose resin 10:

Cellulose acetate butyrate having an acetyl substitution degree of 1.9, a butyryl substitution degree of 0.9, an alkali earth metal content of 6 ppm, a sulfuric acid content (in terms of sulfur) of 12 ppm, a free acid content of 20 ppm, and an intrinsic viscosity of 1.5 dl/g.

<Plasticizer>

| | |
|---|---|
| Plasticizer 1: trimethylolpropane tribenzoate | 10 weight parts |
| Plasticizer 2: triphenyl phosphate | 10 weight parts |

-continued

| <Additives> | |
|---|---|
| Additive 1: IRGANOX 1010 (produced by Ciba Specialty Co., Ltd. | 0.2 weight parts |
| Additive 2: Epoxidated tall oil (Acid trapping agent) | 0.2 weight parts |
| Additive 3: HALS-1 | 0.2 weight parts |

Example 1

(Preparation of Polarizing Plate Protecting Film Samples 1 through 17)

The above cellulose resin 1 was heat treated at 120° C. for 1 hour and cooled to room temperature in a dried air. The above plasticizer and additives were added in the amount described above to 90 parts by weight of the dried cellulose resin to have a composition as shown in polarizing plate protecting film sample 1 of Table 1. The resulting composition was mixed in a Henschel mixer, heated in an extruder to prepare pellets and cooled.

The pellets was dried at 120° C., heat melted at a heat melting temperature as shown in Table 1, extruded from a T die employing an extruder to form a web, stretching the web at 158° C., which was obtained from a roller temperature, in the longitudinal direction by a stretching magnification of 1.1, then stretching the web in a tenter in the lateral direction by a stretching magnification of 1.4, and relaxed. Subsequently, both edges of the web being slit at a slitting section while cooling, the web was cooled to room temperature, knurling treated to provide knurls with a height of 10 μm and a width of 1.5 cm on both edges of the web, and wound around a spool to form a film in the roll form. Thus, a polarizing plate protecting film sample 1 with a thickness of 80 μm, an $R_0$ of 50 nm and an Rt of 130 nm was prepared.

Polarizing plate protecting film samples 2 through 17 were prepared in the same manner as polarizing plate protecting film sample 1, except that a composition as shown in polarizing plate protecting film samples 2 through 17 of Table 1 was used. Polarizing plate protecting film samples 2 through 17 had an $R_0$ of 45-55 nm and an Rt of 125-135 nm.

(Evaluation)

The resulting samples were evaluated for lip contaminations, rupture, and luminescent foreign materials according to the following methods.

<Lip Contaminations>

After 30,000 m of the film was manufactured, deposits of melt at the lip of the T die was observed and evaluated according to the following criteria:

A: No deposits of melt were observed at the lip.
B: Slight deposits of melt were observed at the lip, which was not problematic.
C: Slight deposits of melt were observed at the lip, and streaks were observed on the resulting sample.
D: Deposits of melt were apparently observed at the lip, and streaks were observed on the resulting sample.

<Rupture>

While the film manufacture was continued for one week, rupture of the web was observed at the step from the stretching section to the slitter section, and evaluated according to the following criteria:

A: No rupture of the web occurred.
B: Rupture of the web occurred one to two times.
C: Rupture of the web occurred not less than three times.

The results are shown in Table 1.

TABLE 1

| Polarizing plate protecting film sample No. | Cellulose resin used. | Plasticizer used | Additives used | Heat melting temperature (° C.) | Lip contamination | Rupture | Remarks |
|---|---|---|---|---|---|---|---|
| 1 | 1 | 1 | None | 230 | C | C | Comp. |
| 2 | 1 | 1 | 1 | 230 | B | A | Inv. |
| 3 | 1 | 1 | 1 & 3 | 230 | A | A | Inv. |
| 4 | 1 | 1 | 1, 2, & 3 | 240 | A | A | Inv. |
| 5 | 2 | 1 | 1 | 230 | A | A | Inv. |
| 6 | 2 | 1 | 1 & 3 | 230 | A | A | Inv. |
| 7 | 3 | 1 | 2 & 3 | 230 | B | A | Inv. |
| 8 | 3 | 1 | 3 | 230 | B | A | Inv. |
| 9 | 3 | 1 | 1, 2, & 3 | 230 | A | A | Inv. |
| 10 | 3 | 1 | 1 & 3 | 230 | A | A | Inv. |
| 11 | 4 | 1 | 1 | 230 | B | A | Inv. |
| 12 | 5 | 1 | 1 | 230 | A | A | Inv. |
| 13 | 6 | 2 | 1 | 230 | D | C | Comp. |
| 14 | 7 | 1 | 1 | 230 | D | B | Comp. |
| 15 | 8 | 1 | 1 | 230 | C | C | Comp. |
| 16 | 9 | 1 | 1 | 230 | A | A | Inv. |
| 17 | 10 | 1 | 1 | 230 | A | A | Inv. |

Comp.: Comparative, Inv.: Inventive

As is apparent from Table 1, the inventive polarizing plate protecting film samples provided reduced lip contamination and reduced rupture as compared with the comparative polarizing plate protecting film samples.

(Preparation of Polarizing Plate)

The polarizing plate protecting film samples above and a 80 μm thick cellulose triacetate film KC8UY (produced by Konicaminolta Co., Ltd.) were subjected to alkali saponification processing as described below.

| <Alkali saponification processing> | | |
|---|---|---|
| Saponification | 2 mol/l NaOH solution | 50° C. 90 Seconds |
| Water washing | Water | 30° C. 45 Seconds |

| <Alkali saponification processing> | | |
|---|---|---|
| Neutralization | 10% by weight HCl solution | 30° C. 45 Seconds |
| Water washing | Water | 30° C. 45 Seconds |

The resulting samples and film were dried at 80° C.

<Preparation of Polarizing Film>

A long-length 120 μm thick polyvinyl alcohol film was immersed in an aqueous solution containing 1% by weight of iodine and 4% by weight of boric acid, and stretched at 50° C. in the transporting direction by a stretching magnification of 6 to prepare a polarizing film.

The alkali saponified surface of the polarizing plate protecting film sample obtained above (which also serves as an optical retardation film) and film KC8UY being coated with an adhesive, an aqueous solution containing 5% by weight of completely saponified polyvinyl alcohol, the polarizing plate protecting film sample was adhered through the adhesive onto the surface on a liquid crystal cell of the polarizing film, and the film KC8UY onto the surface of the polarizing film opposite the liquid crystal cell. Thus, polarizing plate samples 1 through 17 were prepared.

(Preparation of VA Type Liquid Crystal Display Samples)

The polarizing plates on both sides of the liquid crystal cell of a VA type liquid crystal display VL-1530S (produced by Fujitsu Co., Ltd.) were peeled. Subsequently, the polarizing plate sample obtained above was adhered onto both sides of the liquid crystal cell instead of the original ones so that the light transmission axis of the polarizing plates was in accordance with that of the original ones. Thus, VA type liquid crystal display samples 1 through 17 were prepared. In the above, two same polarizing plates were employed, and one polarizing plate was adhered onto the surface on the viewer side of the liquid crystal cell and the other onto the surface on the backlight side of the liquid crystal cell, as shown FIG. 1. Further, the polarizing plate was adhered onto the liquid crystal cell so that the polarizing plate protecting film faced the cell surface.

(Evaluation)

The VA type liquid crystal display samples prepared above were evaluated for viewing angle property and moving images according to the following method.

<Viewing Angle Property>

Evaluation of the viewing angle property was carried out by measuring the liquid crystal display samples obtained above, using EZ-contrast (produced by ELDIM). In the measurement, an angle inclined from the direction normal to the liquid crystal display sample surface, at which a contrast ratio of (white display) and (black display) exhibits not less than 10, was determined. When the angle of the normal direction is 0°, the larger the angle, the wider the viewing angle is.

In the invention, when the horizontal direction is angle 0°, the contrast was determined from oblique direction, an angle 45° inclined from the horizontal direction.

The viewing angle property was evaluated according to the following criteria:

A: An angle inclined from the direction normal to the liquid crystal display sample surface was not less than 80°.

B: The angle was from 70° to less than 80°.

C: The angle was less than 70°.

The results are shown in Table 2.

TABLE 2

| Liquid crystal display sample No. | Viewing angle property | Remarks |
|---|---|---|
| 1 | B | Comparative |
| 2 | A | Inventive |
| 3 | A | Inventive |
| 4 | A | Inventive |
| 5 | A | Inventive |
| 6 | A | Inventive |
| 7 | A | Inventive |
| 8 | A | Inventive |
| 9 | A | Inventive |
| 10 | A | Inventive |
| 11 | A | Inventive |
| 12 | A | Inventive |
| 13 | C | Comparative |
| 14 | B | Comparative |
| 15 | B | Comparative |
| 16 | A | Inventive |
| 17 | A | Inventive |

As apparent from Table 2, the inventive liquid crystal display samples employing the polarizing plate of the invention provided wide viewing angle as compared with the comparative liquid crystal display samples.

What is claimed is:

1. A process for manufacturing a polarizing plate protecting film according to a melt casting method, the process comprising the steps of:

providing two film formation compositions, each containing cellulose resin having a total acyl substitution degree of from 2.5 to 2.9, a plasticizer, and 0.01 to 5% by weight of a hindered amine or hindered phenol compound, one of the two film formation compositions having a different content of the plasticizer and a different content of the hindered amine or hindered phenol compound than the other of the two film formation compositions;

heat-melting the two film formation compositions to obtain two melts;

co-extruding the two melts to form a laminated sheet;

cooling the extruded laminated sheet to form a film having a laminated structure;

reheating the film;

stretching the heated film; and cooling the stretched film, wherein the cellulose resin contains an alkaline earth metal in an amount of from 1 to 50 ppm and a residual sulfuric acid (in terms of sulfur content) in an amount of from 0.1 to 45 ppm, based on the weight of cellulose resin.

2. The process of claim 1, wherein the cellulose resin further contains a free acid in an amount of from 1 to 500 ppm, based on the weight of cellulose resin.

3. The process of claim 1, wherein the cellulose resin further contains a free acid in an amount of from 1 to 100 ppm, based on the weight of cellulose resin.

4. The process of claim 1, wherein the polarizing plate protecting film has a retardation in plane $R_0$ of from 30 to 200 nm, and a retardation in the thickness direction Rt of from 70 to 400 nm.

* * * * *